US012570814B2

(12) United States Patent
Takahashi et al.

(10) Patent No.: US 12,570,814 B2
(45) Date of Patent: Mar. 10, 2026

(54) HEAT-SHRINKABLE POLYESTER FILM

(71) Applicant: Bonset America Corporation, Browns Summit, NC (US)

(72) Inventors: Hideaki Takahashi, Browns Summit, NC (US); Ebonii Nicole Neal, Browns Summit, NC (US); Victoria Marie Moncada Meeks, Browns Summit, NC (US)

(73) Assignees: Bonset America Corporation, Browns Summit, NC (US); C.I. TAKIRON Corporation, Osaka (JP)

( * ) Notice: Subject to any disclaimer, the term of this patent is extended or adjusted under 35 U.S.C. 154(b) by 535 days.

(21) Appl. No.: 18/019,821

(22) PCT Filed: Oct. 5, 2021

(86) PCT No.: PCT/US2021/053444
§ 371 (c)(1),
(2) Date: Feb. 6, 2023

(87) PCT Pub. No.: WO2022/076332
PCT Pub. Date: Apr. 14, 2022

(65) Prior Publication Data
US 2023/0287188 A1     Sep. 14, 2023

Related U.S. Application Data

(60) Provisional application No. 63/088,460, filed on Oct. 7, 2020.

(51) Int. Cl.
| | |
|---|---|
| *C08J 5/18* | (2006.01) |
| *B29C 55/02* | (2006.01) |
| *B29C 61/02* | (2006.01) |
| *B29C 61/06* | (2006.01) |
| *B29D 7/01* | (2006.01) |
| *B29K 67/00* | (2006.01) |
| *C08L 67/02* | (2006.01) |

(52) U.S. Cl.
CPC ................. *C08J 5/18* (2013.01); *B29C 55/02* (2013.01); *B29C 61/02* (2013.01); *B29C 61/06* (2013.01); *B29D 7/01* (2013.01); *C08L 67/02* (2013.01); *B29K 2067/00* (2013.01); *C08J 2367/02* (2013.01); *C08J 2467/02* (2013.01)

(58) Field of Classification Search
CPC ...... C08J 5/18; C08J 2367/02; C08J 2467/02; C08L 67/02; B29C 55/02; B29C 61/02; B29C 61/06; B29D 7/01; B29K 2067/00
See application file for complete search history.

(56) References Cited

U.S. PATENT DOCUMENTS

| | | | | | |
|---|---|---|---|---|---|
| 5,859,116 | A | * | 1/1999 | Shih | C08L 67/025 524/493 |
| 2005/0010018 | A1 | | 1/2005 | Kim et al. | |
| 2005/0163986 | A1 | * | 7/2005 | Marlow | C08J 5/18 528/480 |
| 2009/0042024 | A1 | | 2/2009 | Fujii et al. | |
| 2011/0230635 | A1 | | 9/2011 | Lee et al. | |
| 2016/0137833 | A1 | | 5/2016 | Haruta et al. | |
| 2018/0208375 | A1 | | 7/2018 | Haruta et al. | |
| 2019/0048157 | A1 | | 2/2019 | Shih et al. | |
| 2019/0169386 | A1 | | 6/2019 | Inoue et al. | |
| 2020/0002487 | A1 | | 1/2020 | Gesti Garcia et al. | |
| 2020/0062954 | A1 | | 2/2020 | Lim et al. | |
| 2020/0207516 | A1 | | 7/2020 | Seneker et al. | |

FOREIGN PATENT DOCUMENTS

| | | | |
|---|---|---|---|
| CN | 102227461 | A | 10/2011 |
| CN | 105835491 | A | 8/2016 |
| JP | H01127317 | A * | 5/1989 |
| JP | 2018-168382 | A | 11/2018 |
| KR | 10-2009-0030554 | A | 3/2009 |
| WO | 2014/199787 | A | 12/2014 |
| WO | 2017/018345 | A | 2/2017 |
| WO | 2018/025801 | A | 2/2018 |
| WO | 2020/076747 | A | 4/2020 |

OTHER PUBLICATIONS

JPH01127317A Espacenet Translation (Year: 1989).*

* cited by examiner

*Primary Examiner* — Randy P Gulakowski
*Assistant Examiner* — Virginia L Stonehocker
(74) *Attorney, Agent, or Firm* — Yokoi & Co., U.S.A.; Toshiyuki Yokoi

(57) ABSTRACT
The present invention relates to a heat-shrinkable polyester film that exhibits a low value of shrink stress like Polyvinyl chloride resin film. Namely, the provided is a polyester heat-shrinkable film obtained from multiple amorphous polyester resins or the like that are reaction products of a polyvalent carboxylic acid and both a first polyalcohol having an alicyclic structure and a second polyalcohol not having an alicyclic structure, wherein the thermal shrink stress at 85° C. is below 6.8 MPa.

6 Claims, 8 Drawing Sheets

10

10a
10
10b 10c
10

DSC (mW)

TEMPERATURE (℃)

DSC (mW)

TEMPERATURE (℃)

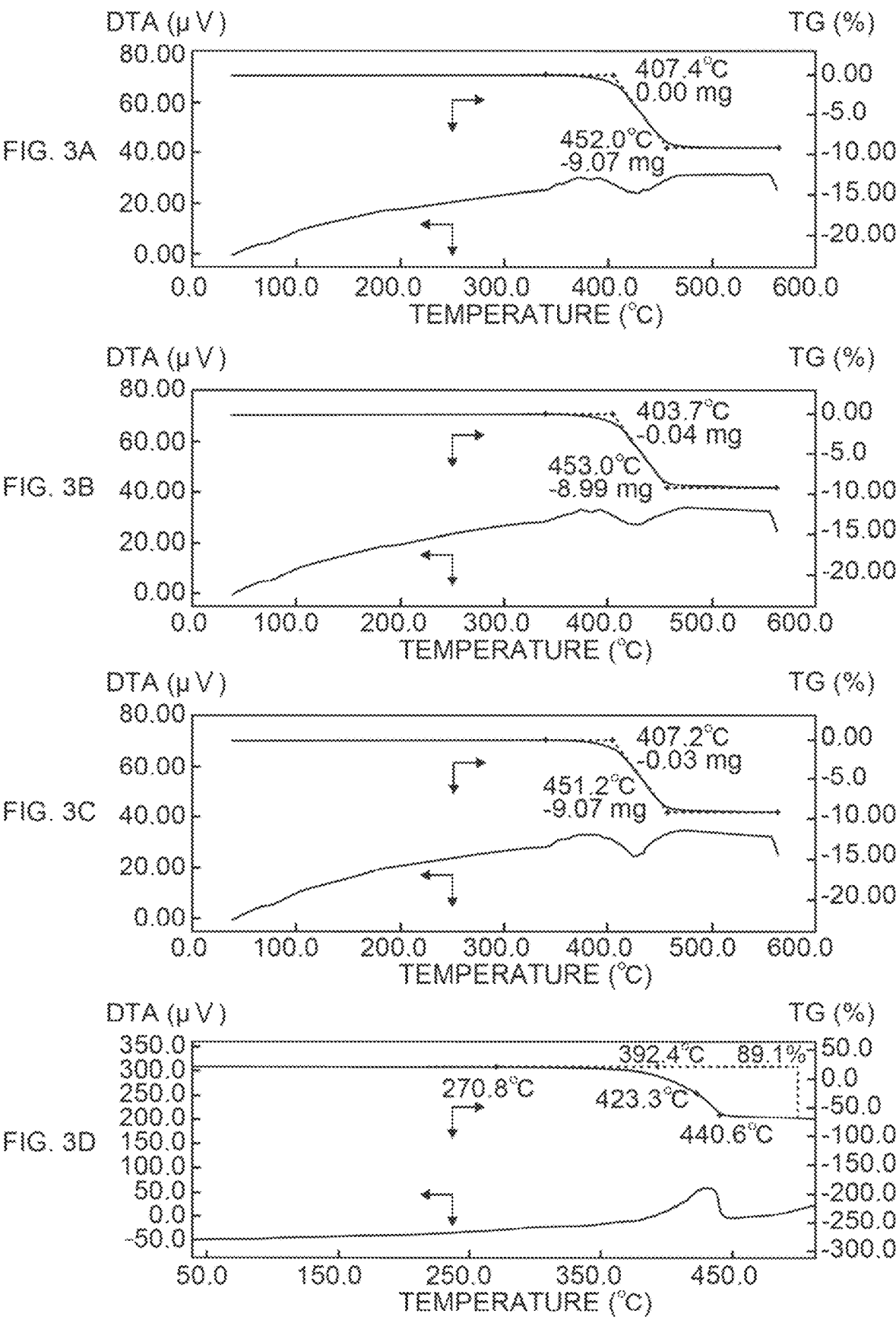

THERMAL SHRINK STRESS (MPa)

FIRST POLYESTER RESIN/SECOND POLYESTER RESIN (-)

GLASS TRANSITION TEMPERATURE (°C)

FIRST POLYESTER RESIN/SECOND POLYESTER RESIN (-)

HEAT-SHRINKABLE POLYESTER FILM

BACKGROUND OF THE INVENTION

1. Field of the Invention

The present invention relates to a heat-shrinkable polyester film.

More specifically, the present invention relates to a heat-shrinkable polyester film containing amorphous polyester resins as a main component, but showing a low value of shrink stress or the like that is approximately equal to that of a polyvinyl chloride resin.

2. Description of the Related Art

Conventionally, as containers for beverages and containers for detergents, polyethylene (HDPE) containers or polyester (PET) bottles (hereinafter, simply referred to as PET bottles and the like in some cases) have been used.

In particular, as containers for beverages, PET bottles have advantages of lightweight property, high durability, and the like, are highly convenient, and have been generally popularized worldwide.

On the other hand, environmental pollutions due to leakage of used PET bottles to the sea after consuming the contents of PET bottles has become a serious problem in the world.

In this regard, in order to solve such an environmental problem, recovery of PET bottles and development for plastic recycling technology have been actively performed.

Furthermore, in order to display information for product labeling and artwork of PET bottles, various labels are coated or pasted to outer walls of the PET bottles.

In this regard, conventionally, a method of pasting a paper label with an adhesive has been often used, but recently, full-surface packaging using a heat-shrinkable film is more common.

In the full-surface packaging, it is difficult to separate heat shrinkable film from bottles completely because of the various shape of PET bottle while the heat-shrinkable film adheres to the outer wall of the PET bottle.

Therefore, the essential requirement for the substrate of heat-shrinkable film is not to inhibit PET bottle recycling process.

In this regard, the qualifications of alternative substrates for Polyvinyl chloride resin (PVC), a polystyrene resin (PS), and a modified polyester resin (PETG) are undergoing.

However, as already described above, a main substrate for beverage containers is a PET resin, and a PETG film is considered to be suitable also in terms of recyclability of PET bottles because of proximity of the chemical compositions to that of the PET resin.

However, the PETG film shows a rapid shrinkage behavior in accordance with an increase in temperature, and the shrink stress thereof is larger than that of other substrates.

Which is to say, once the PETG film is applied to PET bottles and the like, multiple problems may be observed such as label collapse due to a rapid shrinkage behavior, deformation of a container due to a high shrink stress, or the like occurs, and a lower yield in production.

Particularly, in recent years, in order to save the amount of a fossil resource consumption, a thickness reduction for PET bottles for beverages has been in progress. The stiffness of the entire bottle is also lowered in accordance with such a thickness reduction for bottles, and a reduction in shrink stress of the heat-shrinkable film becomes an urgent issue.

In this regard, in order to achieve a reduction in shrink stress and improve impact resistance or the like, it has been proposed to blend some specific polyester plasticizer or the like into a raw material for a heat-shrinkable polyester film (for example, see JP 2018-168382 A (CLAIMS and the like)).

More specifically, such a heat-shrinkable polyester film contains (a) a copolyester having a minimum crystallization half-time ($t_{1/2}$ min) of at least 8.6 minutes, and (b) a polyester plasticizer having a weight-average molecular weight ($M_w$) of 900 to 12000 g/mol.

Furthermore, the copolyester contains
(i) a diacid component containing 100 mol % of residues of terephthalic acid, and
(ii) a diol component containing residues of ethylene glycol, 1,4-cyclohexanedimethanol, diethylene glycol, neopentyl glycol, 2,2,4,4-tetramethyl-1,3-cyclobutanediol, or mixtures thereof.

Further, the polyester plasticizer contains
(i) a polyol component containing residues of 1,2-propanediol, 1,3-butanediol, 1,4-butanediol, or mixtures thereof, and
(ii) a diacid component containing residues of phthalic acid, adipic acid, or mixtures thereof.

Further, the heat-shrinkable polyester film has a glass transition temperature of 50° C. to 90° C. as measured under a predetermined condition.

However, in the heat-shrinkable polyester film described in JP 2018-168382 A, there are concerns that the predetermined polyester plasticizer is bled out due to a change in ambient temperature or over time, and there is a tendency that a shrinkage ratio or mechanical characteristics are degraded, and further, depending on the blending amount, characteristics such as transparency and electrical characteristics are also degraded.

SUMMARY OF THE INVENTION

As a result, the inventors of the present invention have made a great effort to solve the above-mentioned problems, and have found that it is possible to have a considerable amorphous portion and obtain a considerably low thermal shrink stress comparable to that of a polyvinyl chloride heat shrinkable film by using a specific polyalcohol (sometimes referred to the diol component) as one of the raw material components.

Namely, they have found that a considerably low heat-shrinkable stress can be obtained if the polyester heat-shrinkable film has a considerably low calorific value of the melting peak and a specific glass transition temperature measured by DSC (Differential Scanning calorimetry) and considerable amorphous portion.

Thus, the present invention aims to provide a polyester heat-shrinkable film with excellent usability and applicability to various kinds of PET bottles, and with less environmental impacts by demonstrating a low shrink stress equivalent to that of polyvinyl chloride heat-shrinkable film, even though the main component is basically a polyester resin with a considerable amorphous portion.

The present invention (hereinafter sometimes referred to the first invention) is a polyester heat-shrinkable film derived from a mixture of multiple amorphous polyester resins that are reaction products of a polyvalent carboxylic acid and polyalcohols as a mixed resin, wherein the mixed resin includes a first polyester resin comprising a first polyalcohol having an alicyclic structure and a second polyester resin comprising a second polyalcohol not having an alicyclic structure (namely having a non-alicyclic structure), and the thermal shrink stress at 85° C. is below 6.8 MPa in order to solve the aforementioned problems.

In other words, even if the polyester heat-shrinkable film has a considerable amorphous portion derived from a resin mixture containing a predetermined first polyester resin and a second polyester resin, which are multiple amorphous polyester resins of different types, it is possible to provide a polyester heat-shrinkable film that exhibits a low shrink stress equivalent to that of polyvinyl chloride resin film, excels in usability and applicability to various PET bottles, and causes few environmental problems.

By using specific polyalcohols in the first polyalcohol and second polyalcohol, which have different types of polyalcohol components, it is possible to adjust the glass transition temperature, compatibility, etc. of the first polyester resin and the second polyester resin, and in turn, it is possible to keep the thermal shrink stress value below a predetermined value.

In configuring the first invention, it is preferable that the first polyalcohol contains at least 1,4-cyclohexanedimethanol and the second polyalcohol contains at least 2-methyl-1,3-propanediol.

Thus, by using specific polyalcohols as the first polyalcohol and second polyalcohol, respectively, adjustment of the glass transition temperature and compatibility in the first and second polyester resins can be further facilitated, and in turn, the thermal shrink stress value in the resulting polyester heat shrinkable film can be set to a predetermined value.

In configuring the first invention, it is preferable that the blending ratio of the first polyester resin and the second polyester resin is within the range of 20/80 to 80/20 by weight basis.

By controlling the blending ratio by weight basis of the first polyester resin and the second polyester resin in this manner, it is possible to adjust the thermal shrink stress easily and stably at a predetermined temperature while maintaining the properties of the polyester resin, which basically has a considerable amorphous portion, in the polyester heat-shrinkable film.

In configuring the first invention, it is preferable that the glass transition temperature of the first polyester resin is higher than that of the second polyester resin, the glass transition temperature (Tg1) of the first polyester resin is within the range of 60 to 90° C., the glass transition temperature (Tg2) of the second polyester resin is within the range of 50 to 80° C., and the polyester heat-shrinkable film indicates one baseline shifting in DSC measurement that corresponds to one glass transition temperature within the range of 63 to 70° C.

Thus, by controlling the glass transition temperatures such as Tg1 of the first polyester resin and Tg2 of the second polyester resin to be within a predetermined range respectively, the values of shrink stress, etc. at a predetermined temperature can be easily and stably adjusted to be within a desired range while maintaining the properties of the polyester resin that basically has a considerable amorphous portion.

According to the description in JIS K7121:2012, the baseline shifting means a shift of a DSC curve obtained by DSC measurement from a previous baseline to a new baseline, for example, a step-like change.

In configuring the first invention, it is preferable that the inherent viscosity of the first polyester resin is within the range of 0.65 to 0.85 dL/g and the inherent viscosity of the second polyester resin is within the range of 0.65 to 0.85 dL/g, and the difference between the inherent viscosity of the first polyester resin and the inherent viscosity of the second polyester resin is ±0.2 dL/g or less.

If the difference between the inherent viscosity of the first polyester resin and the inherent viscosity of the second polyester resin is within ±0.2 dL/g or less, the mixture of resin will show best compatibility and preferable shrink stress at predetermined temperature, keeping amorphous polyester resin characteristics.

In configuring the first invention, it is preferable that the thermal shrinkage ratio in the main shrinkage direction at 70° C. is within the range of 25-40% and the thermal shrinkage ratio in the main shrinkage direction at 85° C. is within the range of 55-75%.

By controlling the thermal shrinkage ratio at a predetermined temperature in this way, the values of the shrink stress, etc. at a predetermined temperature can be adjusted more easily and stably to the desired range of values, while maintaining the properties in the polyester resin that basically has a considerable amorphous portion.

In configuring the first invention, it is preferable that the numerical value expressed by A1-A2 is within the range of 13-25% when A1(%) and A2(%) are the thermal shrinkage ratio in the main shrinkage direction on the condition that the polyester heat-shrinkable film is immersed in hot water at 65° C. before and after being left in an atmosphere of 23° C. and 50% RH for 60 days (hereinafter, specified aging treatment).

By controlling the change in the thermal shrinkage ratio in the main shrinkage direction at 65° C. before and after the aging treatment to be within the predetermined range, the thermal shrinkage in the main shrinkage direction at 70-85° C. as the actual use temperature can be adjusted more easily and stably.

In configuring the first invention, it is preferable that the numerical value expressed by B1-B2 is within the range of 0-5% when B1(%) and B2(%) are the thermal shrinkage ratio in the main shrinkage direction on the condition that the polyester heat-shrinkable film is immersed in hot water at 85° C. before and after being left in an atmosphere of 23° C. and 50% RH for 60 days.

By controlling the thermal shrinkage ratio in the main shrinkage direction when immersed in hot water at 85° C. before and after the specified aging treatment to be within the specified range, the heat shrinkage property when actually applied to various PET bottles can be further fine-tuned.

In configuring the first invention, it is preferable that the polyester heat-shrinkable film exhibits a melting peak when measured by DSC, the melting peak temperature is within the range of above 164° C. to 170° C., and the calorific value corresponding to the melting peak area is within the range of 6 to 18 mJ/mg.

In this way, even when the DSC measurement shows a melting peak, the melting peak temperature (melting point) can be controlled to be within a predetermined range, and the calorific value corresponding to the melting peak area can be controlled to be within a predetermined range, so that the existence ratio of the crystalline structure to the total amount can be limited and adjusted to include a broad melting region. In addition, the calorific value corresponding to the melting peak area can be adjusted to include a broad melting region.

By including a relatively small crystalline structure in the polyester heat-shrinkable film, which basically has a substantial amorphous portion, it is possible to adjust the predetermined thermal shrink stress and the thermal shrinkage ratio at a predetermined temperature more easily and stably while maintaining the good mechanical strength and transparency.

Another aspect of the present invention (hereinafter referred to as the "second invention") is a polyester heat-shrinkable film derived from a single amorphous polyester resin, which is a reaction product of a polyvalent carboxylic acid and a polyalcohol, wherein the polyalcohol is a mixture of a first polyalcohol having an alicyclic structure and a second polyalcohol having no alicyclic structure, and the thermal shrink stress at 85° C. is below 6.8 MPa.

In other words, in the second invention as well, it is possible to easily and stably adjust the values of the thermal shrink stress, etc. at a predetermined temperature to the desired range while maintaining the properties of the polyester resin that basically has a considerable amorphous portion.

Moreover, since the values of shrink stress, etc. are considerably low without blending in plasticizers, etc., it is possible to provide a polyester heat-shrinkable film with excellent usability and applicability to various PET bottles, and with less environmental problems.

In configuring the second invention, it is preferable that the first polyalcohol contains at least 1,4-cyclohexanedimethanol and the second polyalcohol contains at least 2-methyl-1,3-propanediol.

In this way, the use of specific polyalcohols in the first polyalcohol and second polyalcohol, respectively, contributes to adjusting the glass transition temperature, compatibility, and the like, which in turn contributes to adjusting the thermal shrink stress and the like in the resulting polyester heat-shrinkable film.

In configuring the second invention, the total blending amount of the first polyalcohol and the second polyalcohol to be within the range of 15 to 40% by weight is preferred, when the overall amount of polyalcohol is 100% by weight.

By controlling the total blending amount of the predetermined polyalcohol as one of the raw materials, it becomes even easier to adjust the thermal shrink stress, etc. in the polyester heat-shrinkable film which basically has a considerable amorphous portion.

In configuring the second invention, the blending ratio of the first polyalcohol/second polyalcohol to be within the range of 10/90 to 90/10 by weight basis is preferred.

By controlling the blending ratio of the predetermined polyalcohol as one of the raw materials, it is possible to adjust the values of the thermal shrink stress, etc. at a predetermined temperature easily and stably while maintaining the properties of the polyester resin that basically has a considerable amorphous portion.

In configuring the second invention, it is preferable that the polyester heat-shrinkable film indicates one baseline shifting in the DSC measurement that corresponds to one glass transition temperature in the range of 63-70° C.

Having one glass transition temperature in the predetermined temperature range by the DSC measurement enables to adjust the thermal shrink stress, etc. at the predetermined temperature more easily and stably while maintaining the properties of polyester resins that basically have a considerable amorphous portion.

In configuring the second invention, it is preferable that the thermal shrinkage in the main shrinkage direction at 70° C. is within the range of 25-40% and the thermal shrinkage at 85° C. is within the range of 55-75%.

By controlling the thermal shrinkage at a predetermined temperature in the first and second inventions, respectively, it is possible to adjust the thermal shrink stress, etc. at a predetermined temperature more easily and stably while basically maintaining the properties of the polyester resin having a considerable amorphous portion.

In configuring the second invention, it is preferable that the numerical value express by A1-A2 is within the range of 13-25% when A1(%) and A2(%) are the thermal shrinkage in the main shrinkage direction on the condition that the polyester heat-shrinkable film is immersed in hot water at 65° C. before and after being left in an atmosphere of 23° C. and 50% RH for 60 days.

By controlling the change in the thermal shrinkage in the main shrinkage direction at 65° C. before and after the aging treatment to be within a predetermined range, the thermal shrinkage in the main shrinkage direction at 70-85° C. as the conceivable temperature can be adjusted more easily and stably.

In configuring the second invention, it is preferable that the numerical value expressed by B1-B2 is within the range of 0-5% when B1(%) and B2(%) are the thermal shrinkage ratio in the main shrinkage direction on the condition that the polyester heat-shrinkable film is immersed in hot water at 85° C. before and after being left in an atmosphere of 23° C. and 50% RH for 60 days.

By controlling the thermal shrinkage ratio in the main direction when immersed in hot water at 85° C. before and after the aging treatment to be within the predetermined range, it is possible to have further fine-tuning for the heat shrinkability of this film when it is actually applied to various shape of PET bottles.

In configuring the second invention, it is preferable that the polyester heat-shrinkable film exhibits a melting peak when measured by DSC, the melting peak temperature is within the range of above 164° C. to 170° C., and the calorific value corresponding to the melting peak area is within the range of 6 to 18 mJ/mg.

In this way, even if there is a melting peak in the DSC measurement, by controlling the melting peak temperature (melting point) to be within the predetermined range and controlling the calorific value corresponding to the melting peak area to be within the predetermined range, it is possible to limit the existence ratio of the crystalline structure to the total amount and also to adjust it to be included as a broad melting region.

BRIEF DESCRIPTION OF THE DRAWINGS

FIGS. 3A to 3D are the TG-DTA curves of the polyester heat-shrinkable film corresponding to Example 1, Example 2, comparative Example 1, and the second polyester resin (PETG2), respectively.

DETAILED DESCRIPTION OF THE PREFERRED EMBODIMENTS

First Embodiment

Figure 1A:
FIGS. 1A to 1C are diagrams for describing different embodiments of a shrink polyester film, respectively.
Figure 1B:
Figure 1C:

A first embodiment is as exemplified in FIGS. 1A to 1C, a heat-shrinkable polyester film 10 derived from a mixed polyester resins that are reaction products of a polyvalent carboxylic acid and polyalcohols.

The mixed resin includes a first polyester resin made of a first polyalcohol having an alicyclic structure and a second polyester resin made of a second polyalcohol not having an alicyclic structure, and the thermal shrink stress at 85° C. is below 6.8 MPa.

In other words, the first embodiment is essentially a polyester heat-shrinkable film having a substantial amorphous portion derived from a mixture of a predetermined first polyester resin and a second polyester resin comprising different polyalcohols.

Hereinafter, the first embodiment (Sometimes referred to as the first invention) will be described in detail by being divided into respective configurations with reference to the drawings as appropriate.

1. Polyvalent Carboxylic Acid

As the polyvalent carboxylic acid as one of constituents (raw material components) of the polyester resin, at least one of aliphatic dicarboxylic acid such as adipic acid, sebacic acid, or azelaic acid, aromatic dicarboxylic acid such as terephthalic acid, naphthalenedicarboxylic acid, or isophthalic acid, alicyclic dicarboxylic acid such as 1,4-cyclohexanedicarboxylic acid, or an ester forming derivative thereof, and the like is exemplified.

In particular, when the polyvalent carboxylic acid is terephthalic acid, terephthalic acid has satisfactory reactivity with the polyalcohol, is relatively inexpensive, and is also economically advantageous, which is suitable.

2. Polyalcohol (1) First Polyalcohol

The first polyalcohol, which is one of the raw material components of a first polyester resin (hereinafter referred to as high Tg product), is characterized by its alicyclic structure. In other words, the first polyester resin is characterized as containing a first polyalcohol with at least one alicyclic structure.

In other words, by using a specific polyalcohol as a raw material component in the first polyester resin, the glass transition temperature can be set to a relatively high value in the amorphous polyester resin obtained by reacting with a polyvalent carboxylic acid, and the thermal shrinkage rate, the thermal shrink stress, etc. can be easily adjusted to values within the desired range.

Therefore, it is preferable that the first polyalcohol is at least one of alcohols with an alicyclic structure such as 1,2-cyclohexanediol, 1,4-cyclohexanediol, 1,1-cyclohexanedimethanol, 1,4-cyclohexanedimethanol, 5-norbornene-2,3-dimethanol, hydrogenated bisphenol A, spiro glycol, isosorbide, and the adducts of alkylene oxides (ethylene oxide, propylene oxide, butylene oxide, etc.) of these alcohols with an alicyclic structure.

In particular, 1,4-cyclohexanedimethanol is a preferred polyalcohol component as the first polyalcohol because it reacts with the polyvalent carboxylic acid in an accurate blending ratio, and contributes to reducing the amount of unreacted residue in the first polyester resin. In addition, this component contributes to achieving the glass transition temperature, the thermal shrinkage ratio, the thermal shrink stress, etc. of the first polyester resin within desired range.

Moreover, if the first polyalcohol contains at least 1,4-cyclohexanedimethanol and further contains a predetermined amount of ethylene glycol and diethylene glycol, respectively, it is optimal because the resulting first polyester resin also has good compatibility with the second polyester resin derived from the second polyalcohol described below, and the glass transition temperature, the thermal shrinkage rate, the thermal shrink stress, etc. can be further easily adjusted to be within the desired range.

Therefore, when the total amount of the first polyalcohol is 100 mol %, it is preferable that the content of 1,4-cyclohexanedimethanol is within 20-35 mol %, ethylene glycol is within 50-65 mol %, and diethylene glycol is within 5-20 mol %.

And if the total amount exceeds 100 weight percent, each diol of the first polyalcohol should be proportionally distributed. On the other hand, if the total amount is less than 100 weight percent, it is preferable to include diol components other than these diols to fill the mixture.

(2) Second Polyalcohol

A second polyester resin (hereinafter referred to as a low Tg product) contains the second polyalcohol. The second polyalcohol is a polyalcohol without alicyclic structures, i.e., a linear structure with branches or a linear structure without branches.

Accordingly, the glass transition temperature of the second polyester resin can be made relatively low, at least lower than that of the first polyester resin, and the thermal shrinkage ratio, the thermal shrink stress, etc. can be easily adjusted to be within the desired range in the resulting polyester resin by using a specific polyalcohol as the raw material polyalcohol component.

Therefore, it is preferable to use at least one of ethylene glycol, diethylene glycol, propanediol, butanediol, hexanediol, 1,3-propanediol, 2-methyl-1,3-propanediol, and 2,2-dimethyl-1,3-propanediol (neopentyl glycol) as the second polyalcohol.

In particular, 2-methyl-1,3-propanediol is a more preferred polyalcohol component as the second polyalcohol because it reacts with the polyvalent carboxylic acid in an accurate blending ratio, and contributes to reducing the amount of unreacted residue in the second polyester resin. In addition, this component contributes to achieving the glass transition temperature, the thermal shrinkage rate, the thermal shrink stress, etc. of the second polyester resin within desired range.

Moreover, if the second polyalcohol contains at least 2-methyl-1,3-propanediol and further contains a predetermined amount of ethylene glycol and diethylene glycol, respectively, it is possible to introduce a considerable amount of crystalline portions in the resulting second polyester resin while keeping the crystalline portions relatively small.

In addition, the inclusion of such a predetermined amount of ethylene glycol and diethylene glycol is optimal because it further improves the compatibility between the second polyester resin and the first polyester resin. As a result, the improvement contributes to the adjustability of the glass transition temperature, the thermal shrinkage rate, and the thermal shrink stress, etc. to values within the desired range.

Therefore, as an example, when the overall amount of the second polyalcohol is 100 mol %, it is preferable to use a mixture consisting of 20 to 30 mol % of 2-methyl-1,3-propanediol, 50 to 65 mol % of ethylene glycol, and 5 to 20 mol % of diethylene glycol.

If the total amount of the mixture exceeds 100 mol %, the diols of the second polyalcohol should be proportionally distributed. On the other hand, if the amount is less than 100 mol %, it is preferable to include other diol components other than these diols to fill the mixture.

3. Polyester Resin (1) First Polyester Resin

The first polyester resin is an amorphous polyester resin made by using a polyalcohol having an alicyclic structure, such as at least 1,4-cyclohexanedimethanol, as the first polyalcohol, which is one of the raw material components, and reacting it with a polyvalent carboxylic acid.

Therefore, for example, it is suitable to be a polyester resin with a relatively large amorphous portion, which is made by reacting a dicarboxylic acid comprising 60 to 80% terephthalic acid and 1,4-cyclohexanedimethanol at a ratio of 20 to 40%.

The first polyalcohol may be a polyalcohol having sole alicyclic structure, but it is more preferable to be a mixture of polyalcohols not having an alicyclic structure.

As the polyalcohol not having an alicyclic structure used in combination, it is preferable to use one or more diol components selected from ethylene glycol, diethylene glycol, hexanediol, neopentyl glycol, and the like.

More specifically, when the overall amount of the first polyalcohol is 100 mol %, it is also preferable to use a polyalcohol not having an alicyclic structure, for example, within the range of 10 to 150 mol % in combination.

If necessary, other dicarboxylic acids and diols or hydroxycarboxylic acids may be used to change the thermal or mechanical properties of the polyester heat-shrinkable film, and each may be used solely or combined as a mixture.

Furthermore, in case of configuring the first invention, the glass transition temperature (Tg1) of the first polyester resin is preferred to be within the range of 60° C. to 90° C. on the assumption that the glass transition temperature (Tg1) of the first polyester resin is higher than the glass transition temperature (Tg2) of the second polyester resin.

The reason for this is that, when Tg1 is lower than 60° C., heat resistance, durability, and the like of the first polyester resin are significantly degraded, and natural shrinkage of the heat-shrinkable polyester film containing the first polyester resin becomes large, so that storability is significantly degraded in some cases.

On the other hand, the reason for this is that, when Tg1 is higher than 90° C., it is difficult to accurately adjust the heat-shrinkable characteristics of the heat-shrinkable polyester film, and particularly, the thermal shrinkage ratio as measured at 85° C. or lower is likely to be out of the predetermined range in some cases.

Therefore, Tg1 is highly preferred to be within the range of 55° C. to 75° C. and is further preferred to be within the range of 58° C. to 72° C.

Figure 2A:
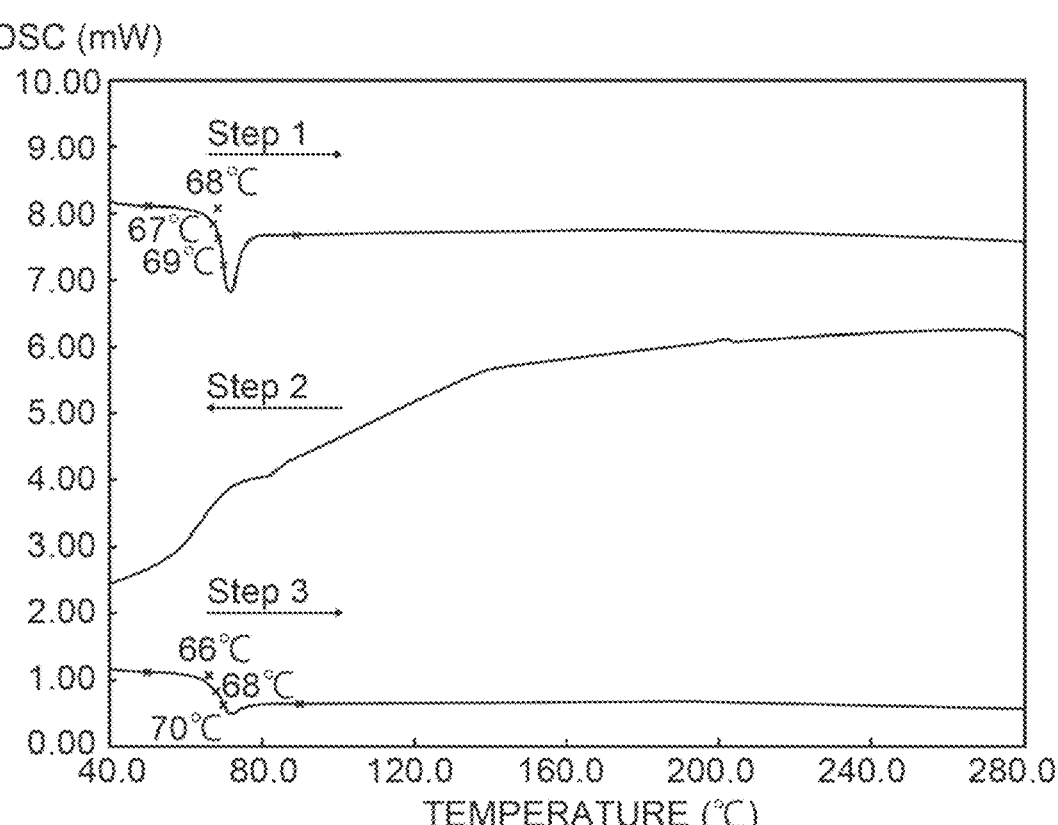
FIGS. 2A to 2B are the DSC charts for the first polyester resin (PETG1) of the present invention (the first invention) and the second polyester resin (PETG2) of the present invention (the first invention), respectively.

Herein, FIG. 2A shows an example of a DSC curve of the first polyester resin obtained by DSC measurement in accordance with JIS K7121:2012 (the same applies hereinafter).

Namely, the sample of the first polyester resin is heated up from 25° C. to 280° C. at a temperature increase rate of 10° C./min as step 1 by using DSC.

Then, the sample is lowered from 280° C. to 25° C. at a rate of 30° C./min as step 2.

Furthermore, the glass transition temperature (Tg1) of the first polyester resin can be accurately determined from the change point of the DSC curve, which is obtained by increasing the temperature as Step 3 (temperature increase from 25° C. to 280° C. at a temperature increase rate of 10° C./min).

The glass transition temperature (Tg1) is also measured in accordance with HS K7121:2012, and the specific heat change temperature obtained in Step 3 is adopted as such Tg1.

In addition, in constructing the first invention, it is preferable that the inherent viscosity (IV value) of the first polyester resin is within the range of 0.65 to 0.85 dL/g.

In relation to the inherent viscosity (IV value) of the second polyester resin to be described later, it is preferable that the difference between the inherent viscosity of the first polyester resin and the second polyester resin is ±0.2 dL/g or less.

The reason for this is that if the inherent viscosity of the first polyester resin is less than 0.65 dL/g, the melt viscosity of the first polyester resin may be too low, causing problems with extrudability.

On the other hand, if the inherent viscosity of the first polyester resin exceeds 0.85 dL/g, the uniform mixability with the second polyester resin may be significantly reduced.

In addition, if the inherent viscosity of the first polyester resin becomes excessively large, the melt viscosity also becomes too high, which may cause problems in extrusion molding.

Moreover, if the difference between the inherent viscosity of the first polyester resin and that of the second polyester resin in relation to the inherent viscosity (IV value) of the second polyester resin exceeds ±0.2 dL/g, the compatibility and mixability of the first polyester resin and the second polyester resin may be significantly reduced.

Therefore, it is more preferable that the inherent viscosity of the first polyester resin is within the range of 0.68 to 0.83 dL/g, and even more preferable that it is within the range of 0.7 to 0.8 dL/g. Moreover, it is more preferable that the difference between the inherent viscosity of the first polyester resin and that of the second polyester resin is within the range of ±0.1 dL/g. It is more preferable that the difference between the first polyester resin and the inherent viscosity of the second polyester resin is within ±0.1 dL/g.

The inherent viscosity of the first polyester resin and the second polyester resin can be measured in accordance with JIS K7390 (the same applies hereinafter).

(2) Second Polyester Resin

The second polyester resin is an amorphous polyester resin obtained by using at least 2-methyl-1,3-propanediol as the polyalcohol and reacting this material with a polyvalent carboxylic acid.

Therefore, the second polyester resin is, for example, an amorphous polyester resin obtained by reacting dicarboxylic acid composed of 100 mol % of terephthalic acid or the like with 2-methyl-1,3-propanediol or the like at a ratio of 20 to 40 mol %.

Further, as necessary, in order to control the properties of the film, other dicarboxylic acids and diols or hydroxycarboxylic acid may be used. Furthermore, these may be used solely or may be used as a mixture.

Furthermore, in case of configuring the first invention, it is preferable that the glass transition temperature (Tg2) of the second polyester resin is lower than the glass transition temperature (Tg1) of the first polyester resin, and the glass transition temperature (Tg2) is within the range of 50° C. to 80° C.

The reason for this is that, when Tg2 is below 50° C., heat resistance, durability, and the like of the second polyester resin are significantly degraded, and natural shrinkage of the heat-shrinkable polyester film containing the second polyester resin becomes large, so that storagebility of this film is significantly degraded in some cases.

On the other hand, the reason for this is that, when Tg2 is above 80° C., it is difficult to accurately adjust the heat-shrinkable property of the heat-shrinkable polyester film to be obtained, and particularly, the thermal shrinkage ratio at 75° C. or lower is likely to be out of the predetermined range in some cases.

Therefore, Tg2 is more preferably to be within the range of 55° C. to 75° C. and further preferably to be within the range of 58° C. to 70° C.

Figure 2B:
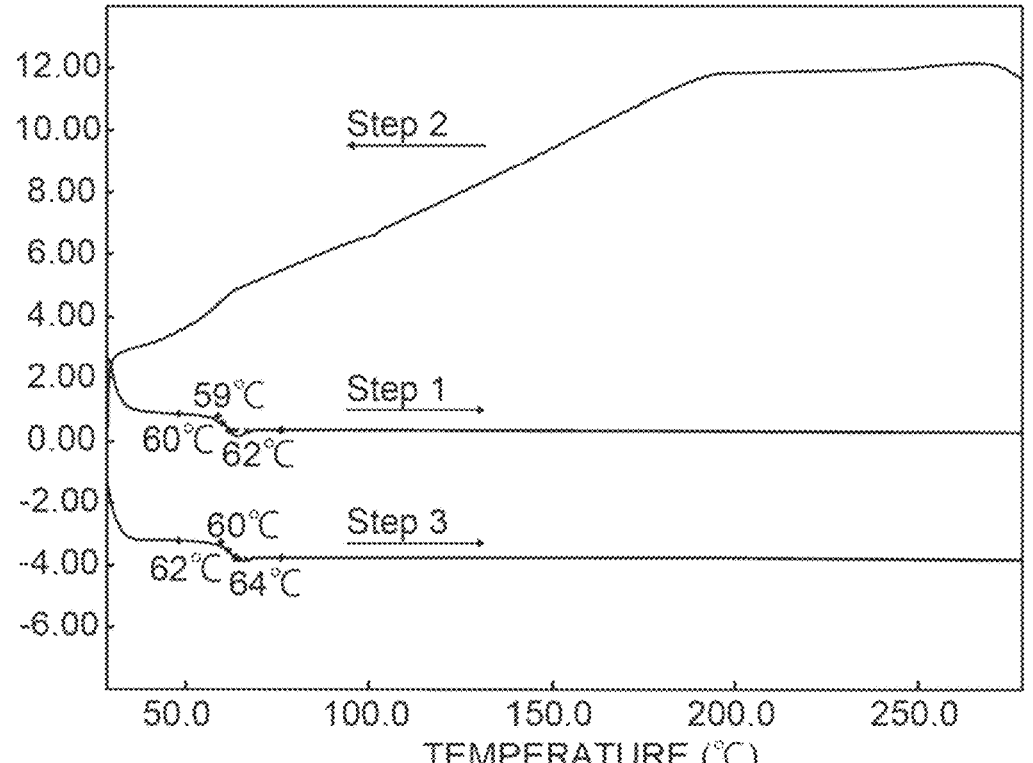
Figure 4A:
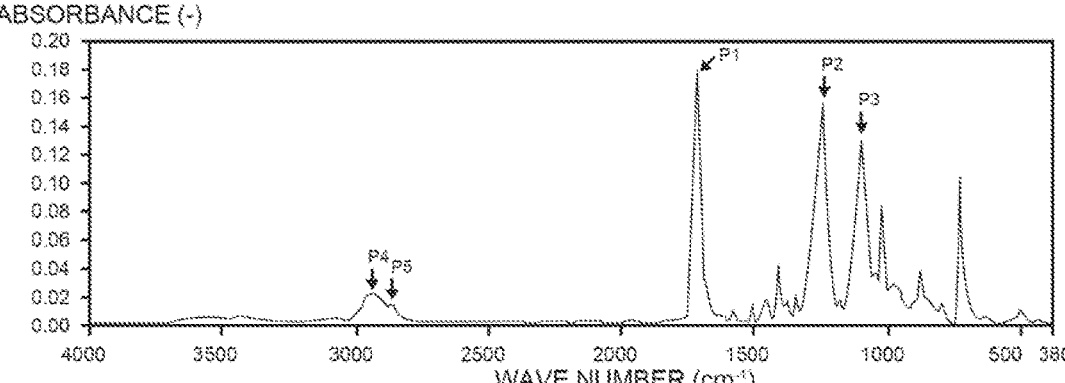
FIGS. 4A to 4D show the FT-IR charts of the heat-shrinkable the film corresponding to Example 1, Example 2, comparative Example 1, and the second polyester resin (PETG2), respectively.
Figure 4B:
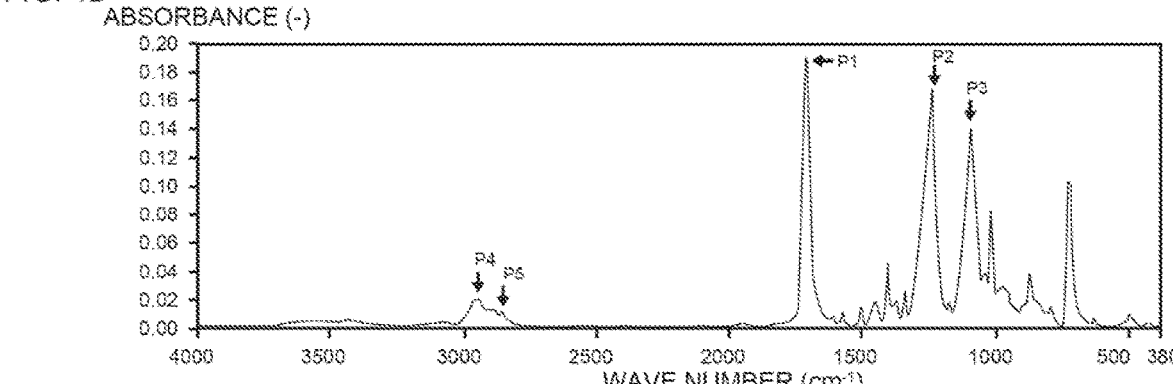
Figure 4C:
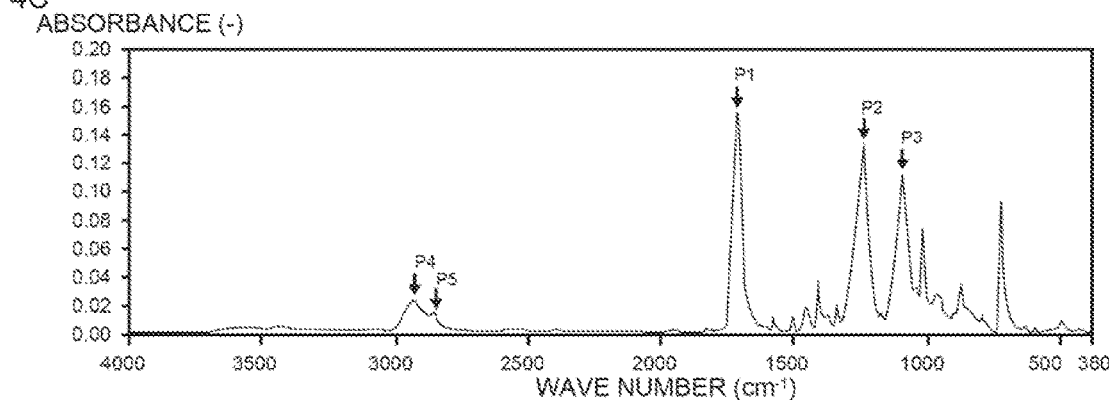
Figure 4D:
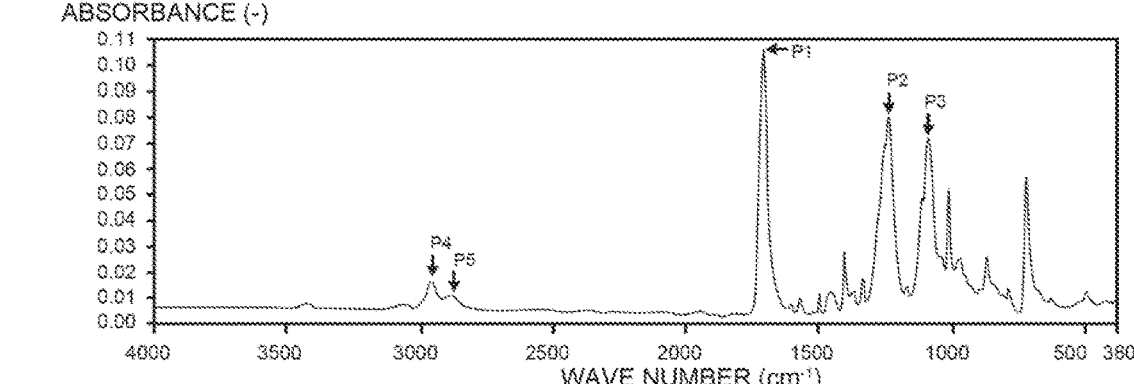

FIG. 2B shows an example of a DSC curve of the second polyester resin obtained by DSC in accordance with JIS K7121:2012, as in case of the first polyester resin in FIG. 2A.

The glass transition temperature (Tg2) of the second polyester resin is also measured in accordance with HS K7121:2012 in the same manner as Tg1 of the first polyester resin, and the specific heat change temperature obtained in Step 3 is adopted as such Tg2.

For reference, FIGS. 3A to 3D are the TG-DTA curves of the polyester heat-shrinkable film corresponding to Example 1, Example 2, Comparative Example 1, and the second polyester resin (PETG2), respectively.

Based on the TG-DTA curves, the glass transition temperature tends to increase as the content ratio of PETG2 in the polyester heat-shrinkable film decreases.

As for the decomposition behavior around the decomposition start temperature, the gradient of the TG curve tends to become smaller as the content ratio of PETG2 in the polyester heat-shrinkable film decreases.

Similarly, for reference, FIGS. 4A to 4D show the FT-IR charts of the heat-shrinkable film corresponding to Example 1, Example 2, Comparative Example 1, and the second polyester resin (PETG2), respectively.

Based on the FT-IR charts, the area of the peak around the wavenumber of 2950 cm$^{-1}$ (ascribed to CH stretching of alkanes, see P4 in FIGS. 4A to 4D) is slightly larger, and the peak height also increases.

On the other hand, the area of the peak around the wavenumber of 2850 cm$^{-1}$ (also ascribed to CH stretching of alkanes, see P5 in FIGS. 4A to 4D) is almost the same, and only the peak height tends to increase.

As is clear from the above explanation, the trends of the TG-DTA curves in FIGS. 3A to 3D and the FT-IR charts in FIGS. 4A to 4D are one reference material in the identification of the first polyester resin, the second polyester resin, and the polyester heat-shrinkable film of the present invention.

Furthermore, in case of configuring the first invention, it is preferable that the inherent viscosity (IV value) of the second polyester resin is within the range of 0.65 to 0.85 dL/g.

The reason for this is that, when the inherent viscosity of the second polyester resin is below 0.65 dL/g, the melt viscosity is too low, and thus a problem in extrusion moldability occurs in some cases.

On the other hand, the reason for this is that, when the inherent viscosity of the second polyester resin is above 0.85 dL/g, uniform mixability with the first polyester resin is significantly degraded or adjustment of the thermal shrink stress or the like becomes difficult in some cases. In addition, the reason for this is that the melt viscosity of the second polyester resin is too high, and thus a problem in extrusion moldability occurs in some cases.

Therefore, the inherent viscosity of the second polyester resin is more preferably to be within the range of 0.68 to 0.83 dL/g and further preferably to be within the range of 0.7 to 0.8 dL/g.

However, in determining the inherent viscosity of the second polyester resin, it is also preferable to consider the inherent viscosity of the first polyester resin.

That is, it is preferable that the difference between the inherent viscosity of the second polyester resin and the inherent viscosity of the first polyester resin is within the range of ±0.2 dL/g, and it is more preferable that the difference is within the range of ±0.01-0.1 dL/g, and it is even more preferable that the difference is within the range of ±0.05-0.1 dL/g.

(3) Blending Ratio

In case of configuring the first invention, it is preferable that a blending ratio of the first polyester resin and the second polyester resin is within the range of 20/80 to 80/20 by weight basis.

The reason for this is that, when the blending ratio of the first polyester resin/the second polyester resin is below 20/80, the adjustment of the thermal shrink stress and the thermal shrink force of the heat-shrinkable polyester film become difficult. Further, the distortion, the collapse, and the like at the time of label attachment due to a rapid shrinkage behavior are likely to occur in some cases.

On the other hand, the reason for this is that, when the blending ratio of the first polyester resin/the second polyester resin is above 80/20, the adjustment of the thermal shrink stress and the thermal shrink force of the heat-shrinkable polyester film becomes difficult. Further, the deformation and the like of a container due to a high shrink stress are likely to occur in some cases.

Therefore, the blending ratio of the first polyester resin and the second polyester resin is more preferably within the range of 30/70 to 70/30 and further preferably within the range of 40/60 to 60/40 by weight basis.

Figure 5A:
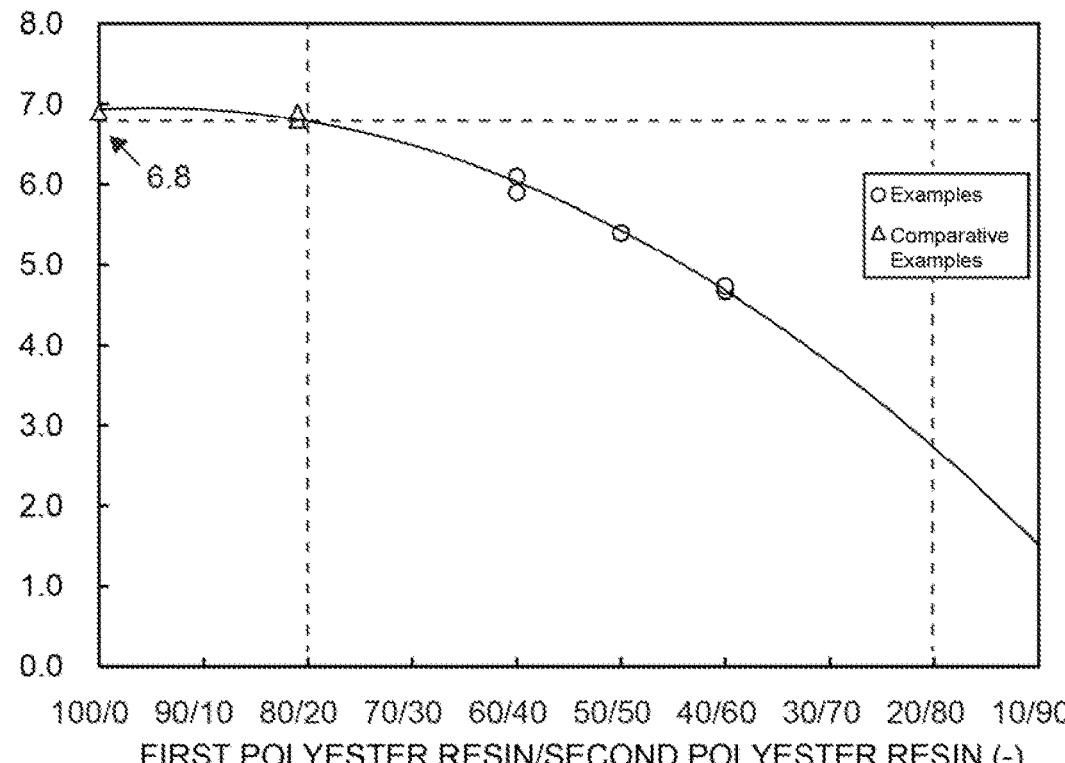
FIGS. 5A to 5B illustrate the effects of the blending ratio for the first polyester resin (PETG1) and the second polyester resin (PETG2) on the thermal shrink stress and glass transition temperature, respectively.
Figure 5B:
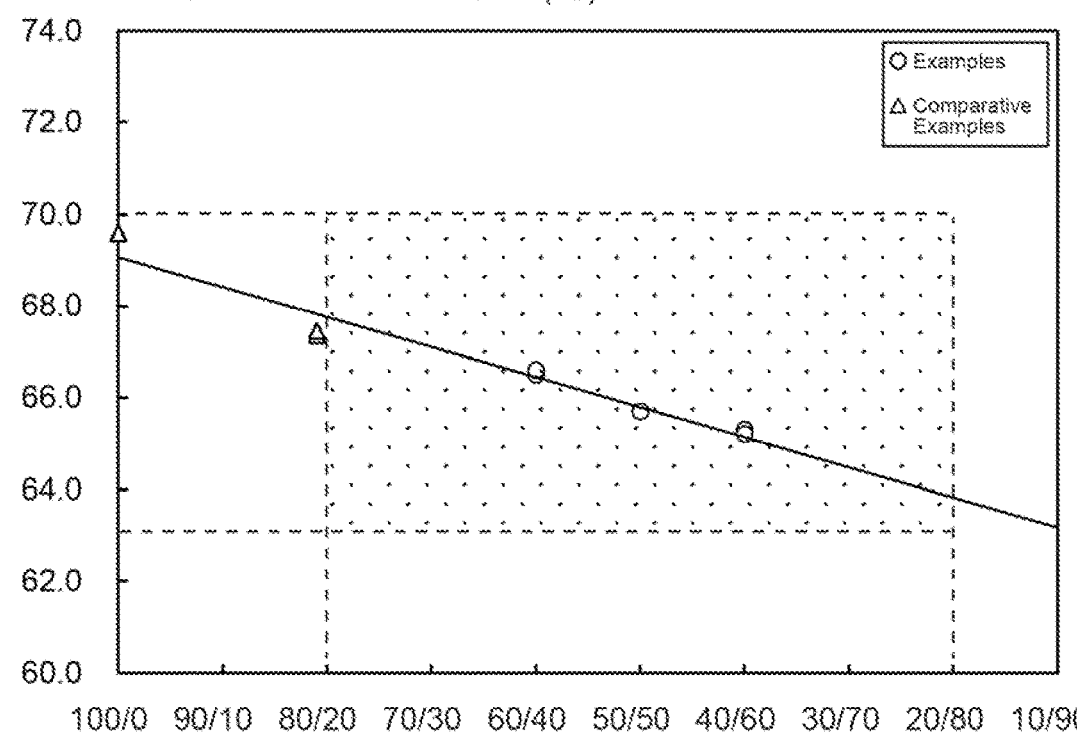

Herein, with reference to FIG. 5A, an influence of the blending ratio of the first polyester resin and the second polyester resin in the first invention on the thermal shrink stress will be described.

That is, the blending ratio (-) of the first polyester resin and the second polyester resin is represented on the horizontal axis, and the thermal shrink stress (MPa) at 85° C. is represented on the vertical axis.

As understood from the characteristic curve in FIG. 5A, by setting the blending ratio of the first polyester resin and the second polyester resin to be within the range of 20/80 to 80/20 by weight basis, a low thermal shrink stress, that is, a value of below 6.8 MPa equivalent to the value of the heat-shrinkable polyvinyl chloride film at 85° C. can be obtained.

Namely, by reducing the blending amount of the first polyester resin and, conversely, increasing the blending amount of the second polyester in order to set the blending ratio of the first polyester resin and the second polyester resin to 80/20 or less, a low thermal shrink stress which is below 6.8 MPa equivalent to the value of the heat-shrinkable polyvinyl chloride film at 85° C. can be obtained.

Furthermore, by setting the blending ratio of the first polyester resin and the second polyester resin to be within the range of 40/60 to 60/40 by weight basis, a low heat shrinkage stress in the range of 4.5 to 6 MPa at 85° C. can be stably obtained.

(4) Additives

It is also preferable to blend additives such as an antioxidant, a weathering stabilizer, an antistatic agent, an antifog agent, a metal soap, a wax, an antifungal agent, an antibacterial agent, a nucleating agent, a flame retardant, or a slipping agent, as necessary, in the heat-shrinkable film of the first invention.

In particular, in order to improve slippiness of the film surface, it is preferable to contain inorganic slipping agents such as calcium carbonate particles, silica particles, or glass particles.

As one of the additives, it is also desirable to add relatively small amount of crystalline polyester resins in order to adjust the heat resistance and the thermal shrinkage ratio.

That is, when the overall amount of the resin constituting the polyester heat-shrinkable film is 100% by weight, the blending amount of the crystalline polyester resin is preferred to be within the range of 1 to 40% by weight, more preferably to be within the range of 2 to 40% by weight, and even more preferably to be within the range of 3 to 30% by weight.

Furthermore, the method for adding additives are not particularly limited, and publicly known methods can be used. However, addition by a masterbatch is suitable since it is simple and excellent in uniform mixability.

For example, as a specific example (commercially available product) of a polyester resin-based masterbatch at the time of blending an anti-blocking agent, an anti-blocking agent (Contains: 20% silica, manufactured by Sukano AG, trade name: G dc S559-E) and the like are exemplified.

Other than, including the crystalline polyester resins mentioned above, it is also preferable to blend other resins in the range that does not impair the physical properties, particularly the shrinkage ratio and the shrink stress, of the heat-shrinkable film of the first invention.

(5) Thermal Shrink Stress

Furthermore, in the heat-shrinkable film of the first invention, the thermal shrink stress in the main shrinkage direction at 85° C. is below 6.8 MPa.

The reason for this is that, when the thermal shrink stress at 85° C. is 6.8 MPa or more, the same thermal shrink stress as that of the heat-shrinkable polyvinyl chloride film is not obtainable, and as a result, general-purpose versatility that the heat-shrinkable polyester film can meet the requirements for various PET bottles having from a thin thickness to a thick thickness, is not obtainable in some cases.

Therefore, such a thermal shrink stress is more preferably to be within the range of 4 to 5.8 MPa and further preferably to be within the range of 4.5 to 5.5 MPa.

Incidentally, the thermal shrink stress at 85° C. is calculated by the following procedure.

That is, the thermal shrink force (N/15 mm) at 85° C. of an elongated test piece as measured by using a film thermal shrinkage tester according to ISO 14616-1997 is calculated by being divided by the thickness of the test piece.

(6) Thermal Shrinkage Ratio

Furthermore, it is preferable that, in the heat-shrinkable polyester film, generally, a thermal shrinkage ratio in a main shrinkage direction (generally, a TD direction, the same applies hereinafter) as measured at 70° C. in hot water is within the range of 25 to 40%, and a thermal shrinkage ratio in the main shrinkage direction as measured at 85° C. in hot water is within the range of 55 to 75%.

The reason for this is that, when the thermal shrinkage ratio in the main shrinkage direction as respectively measured at 70° C. and 85° C. in the heat-shrinkable polyester film are out of the aforementioned predetermined range, the same general-purpose versatility as that of the heat-shrinkable polyvinyl chloride film that the heat-shrinkable polyester film can meet the requirements for various PET bottle having from a thin thickness to a thick thickness and having complicated shapes, is not obtainable in some cases.

Therefore, the thermal shrinkage ratio in the main shrinkage direction at 70° C. in hot water is more preferably within the range of 26 to 38% and further preferably within the range of 27 to 36%.

Further, the thermal shrinkage ratio in the main shrinkage direction as measured at 85° C. in hot water is more preferably within the range of 56 to 73% and further preferably within the range of 58 to 70%.

Other than, in order to make the heat-shrinkable polyester film of the first invention further approximate to thermal characteristics of a heat-shrinkable polyvinyl chloride film and to effectively prevent natural shrinkage at the time of storage, the thermal shrinkage ratio in the main shrinkage direction (TD direction) as measured at 60° C. in hot water is more preferably 8% or less, and the thermal shrinkage ratio in the main shrinkage direction as measured at 75° C. in hot water is further preferably within the range of 42 to 48%.

The thermal shrinkage is measured in accordance with ASTM D2732-08. When measuring the thermal shrinkage, the material is left in an atmosphere of 23° C. and 50% RH for at least 40 hours as a prescribed pretreatment.

Figure 6A:
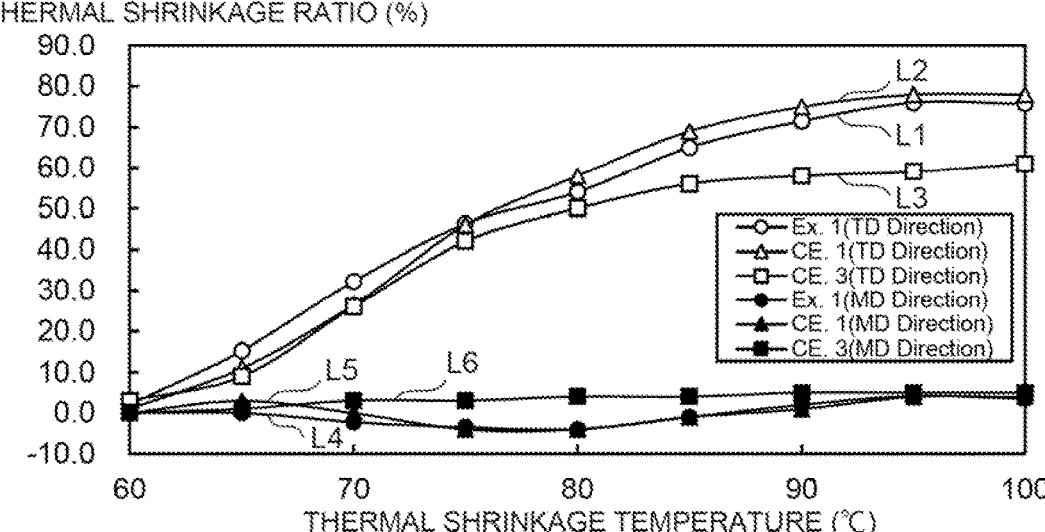
FIG. 6A shows the thermal shrinkages of Example 1, Comparative Example 1, and Comparative Example 3 in the present invention (the first invention)

FIG. 6A shows the characteristic curves (L1, L2, and L3) of the thermal shrinkage ratio (in the TD direction, which is the main shrinkage direction) of the polyester heat-shrinkable films of Example 1, Comparative Example 1, and Comparative Example 3 at each measurement temperature.

Similarly, for the polyester heat-shrinkable films of Example 1, Comparative Example 1, and Comparative Example 3 described below, the thermal shrinkage ratio (in the MD direction orthogonal to the TD direction) at each measurement temperature is shown as characteristic curves (L4, L5, and L6), respectively.

It can be said that the characteristic curve (L1) corresponding to Example 1 in FIG. 6A approximates more nearly the characteristic curve (L3) corresponding to the heat-shrinkable polyvinyl chloride film of Comparative Example 3 at least at a temperature range of 70° C. to 85° C. than the characteristic curve (L2) corresponding to the heat-shrinkable polyester film of Comparative Example 1 solely using the first polyester resin.

Further, temperatures of 70° C. to 85° C. are practically used temperatures that are often used when the heat-shrinkable polyester film is thermally shrunk.

Therefore, from comparison of the characteristic curves L1, L2, and L3 shown in FIG. 6A, it is understood that, in the case of the heat-shrinkable polyester film (for example, Example 1) derived from a mixture obtained by blending the first polyester (PETG 1) and the second polyester (PETG 2) at a predetermined ratio, the same general-purpose versatility as that of the heat-shrinkable polyvinyl chloride film that the heat-shrinkable polyester film can meet the requirements for various PET bottles having from a thin thickness to a thick thickness and having complicated shapes, is easily obtainable.

(7) Change in Thermal Shrinkage Ratio Before and After Aging Treatment

Furthermore, it is preferable that, when thermal shrinkage ratio in the main shrinkage direction at the time of immersing the heat-shrinkable polyester film in hot water set at 65° C. before and after being left to stand for 60 days in an atmosphere of 23° C., 50% RH as the aging treatment are designated as A1(%) and A2(%), a numerical value expressed as A1-A2 is within the range of 13 to 25%.

Furthermore, it is preferable that, when thermal shrinkage ratio in the main shrinkage direction at the time of immersing the heat-shrinkable polyester film in hot water set at 70° C. to 85° C., particularly in hot water set at 85° C., before and after being left to stand for 60 days in an atmosphere of 23° C., 50% RH are designated as B1(%) and B2(%), a numerical value expressed as B1-B2 is within the range of 0 to 5%.

The reason for this is that, when the numerical value expressed as A1-A2 is out of the predetermined range in the heat-shrinkable polyester film, this affects a change in thermal shrinkage ratio in the main shrinkage direction as measured as 70° C. to 85° C. in some cases.

As a result, it is difficult to easily adjust the thermal shrink stress at a predetermined temperature and applicability to various PET bottles in the heat-shrinkable polyester film thus obtained in some cases.

Furthermore, the reason for this is that, when the numerical value expressed as B1-B2 is out of the predetermined range in the heat-shrinkable polyester film, the shrinkage ratio is changed, and thus the process conditions to be used need to be significantly changed when the heat-shrinkable polyester film is practically applied to various PET bottles.

Figure 6B:
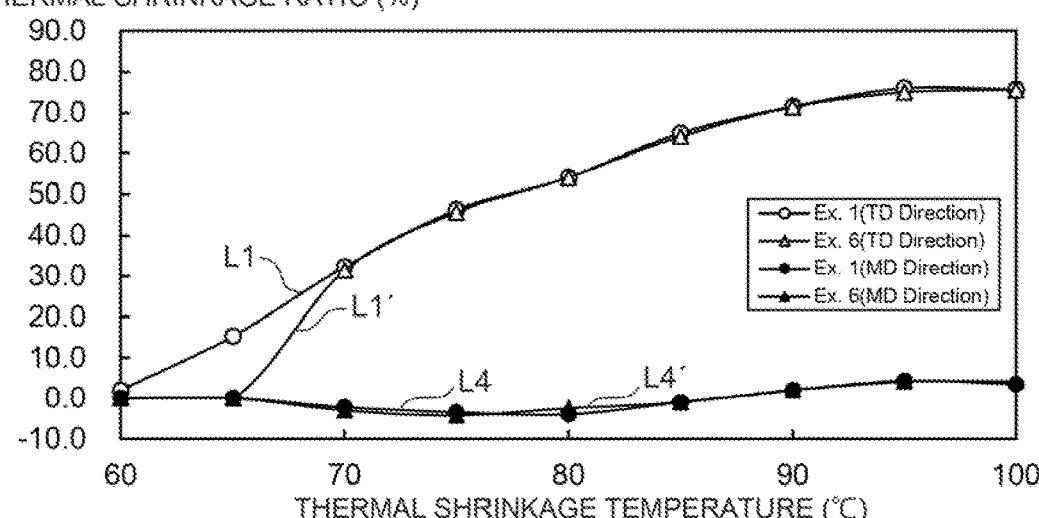
FIG. 6B shows the thermal shrinkages (before and after aging treatment) of Example 1 and Example 3 in the present invention (the first invention)

Herein, FIG. 6B shows thermal shrinkage ratio at respective measurement temperatures of the heat-shrinkable polyester film of Example 1 (L1) described below and Example 3 (L1') corresponding to the heat-shrinkable polyester film subjected to the aging treatment under a predetermined environmental condition thereof (in an atmosphere of 23° C., 50% RH, for 60 days) as references.

From comparison of the characteristic curves L1 and L1' shown in FIG. 6B, in the case of the heat-shrinkable polyester film (for example, Example 1) derived from a mixture obtained by blending the first polyester resin (PETG 1) and the second polyester resin (PETG 2) at a predetermined ratio, even when the aging treatment is performed under a predetermined condition, there is no significant difference in thermal shrinkage ratio at least at a temperature range of 70° C. to 85° C.

That is, in the case of performing the aging treatment under a predetermined condition, the thermal shrinkage ratio in a low temperature range of 65° C. or the like is lowered by only about 15%.

Thus, according to the invention, it is understood that, in the case of the heat-shrinkable polyester film derived from a mixture obtained by blending a specific first polyester resin and a specific second polyester resin at a predetermined ratio, even when the aging treatment is performed, practical problems do not occur very often.

Figure 6C:
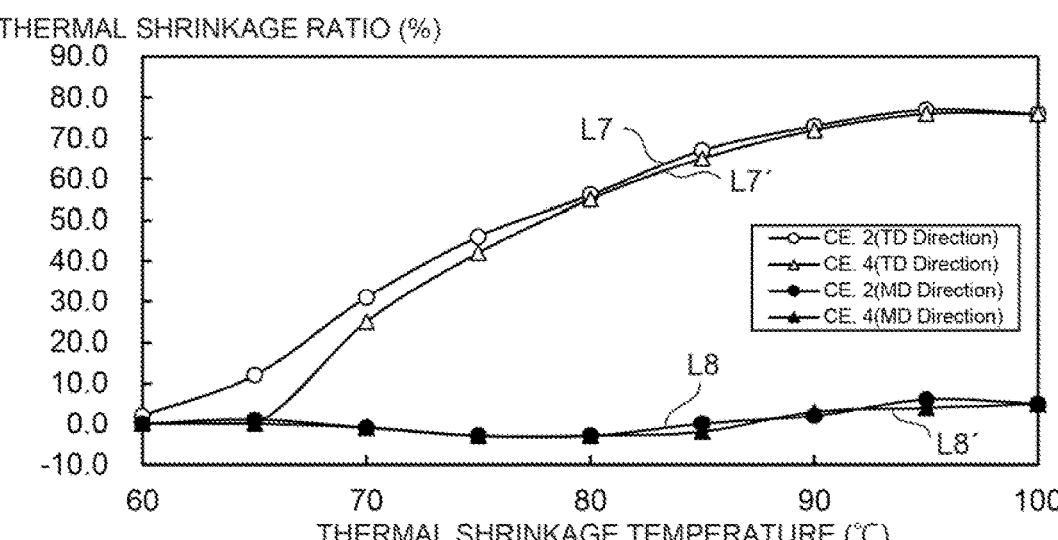
FIG. 6C shows the thermal shrinkages (before and after aging treatment) of Comparative Example 2 and Comparative Example 4 in the present invention (the first invention).

In contrast, FIG. 6C shows the thermal shrinkage ratio of Comparative Example 2 and Comparative Example 4 (before and after aging treatment) in the present invention (the first invention).

From the comparison of the characteristic curves L7 and L7' shown in FIG. 6C, if the polyester heat-shrinkable film is derived from a mixture of the first polyester resin (PETG1) and the second polyester resin (PETG2) in a predetermined ratio (e.g., Comparative Example 2 and Comparative Example 4), the value of the thermal shrinkage ratio tends to decrease relatively significantly, at least in the low temperature range of 65° C. to 75° C., when the film is aged under predetermined conditions.

In other words, it was confirmed that the thermal shrinkage in the low temperature region decreased by more than 15% when the film was aged under the specified conditions.

(8) Melting Peak Temperature and Calorific Value Corresponding to the Melting Peak Area In the case where the polyester heat-shrinkable film of the first invention has a melting point, it is preferable that the melting peak temperature measured by DSC is within the range of above 164° C. to 170° C., and likewise, the calorific value corresponding to the melting peak area is within the range of 6 to 18 mJ/mg.

The reason for this is that even if such a polyester heat-shrinkable film has a melting point measured by DSC, by controlling the melting point to be within the predetermined range and controlling the calorific value corresponding to the melting peak area at the melting point of the film to be within the predetermined range, the amount of crystalline structure present can be slightly limited and also adjusted to provide a broad melting region.

Therefore, in the resulting polyester heat-shrinkable film, the thermal shrink stress at a predetermined temperature and the thermal shrinkage ratio at a predetermined temperature, respectively, can be adjusted more easily and stably while maintaining the mechanical strength, transparency, etc., derived from a small amount of broad crystalline structure.

Conversely, if the melting point measured by DSC is outside the above-mentioned predetermined range, the thermal shrink stress in the main shrinkage direction measured at 85° C. would exceed the predetermined value, which would result in a decrease in usability and may prevent the film from being versatile enough to be used for various kinds of PET bottles having thin to thick walls.

If the calorific value corresponding to the melting peak area of the polyester heat-shrinkable film is outside the predetermined range described above, it may contain excessive crystalline structure, making it difficult to further approximate the thermal and mechanical properties of polyvinyl chloride heat-shrinkable film.

Therefore, it is more preferable that the melting peak temperature of such polyester heat-shrinkable film measured by DSC is within the range of 164.5-169.5° C., and even more preferable that it is within the range of 165-169° C.

As for the calorific value corresponding to the melting peak area of such polyester heat-shrinkable film measured using DSC, it is more preferable that the calorific value corresponding to the melting peak area is within the range of 7 to 16 mJ/mg, and it is even more preferable that the calorific value corresponding to the melting peak area is within the range of 8 to 14 mJ/mg.

Here, the DSC curves of polyester heat-shrinkable films are explained with reference to FIGS. 7A and 7B.

Figures 7A, 7B:
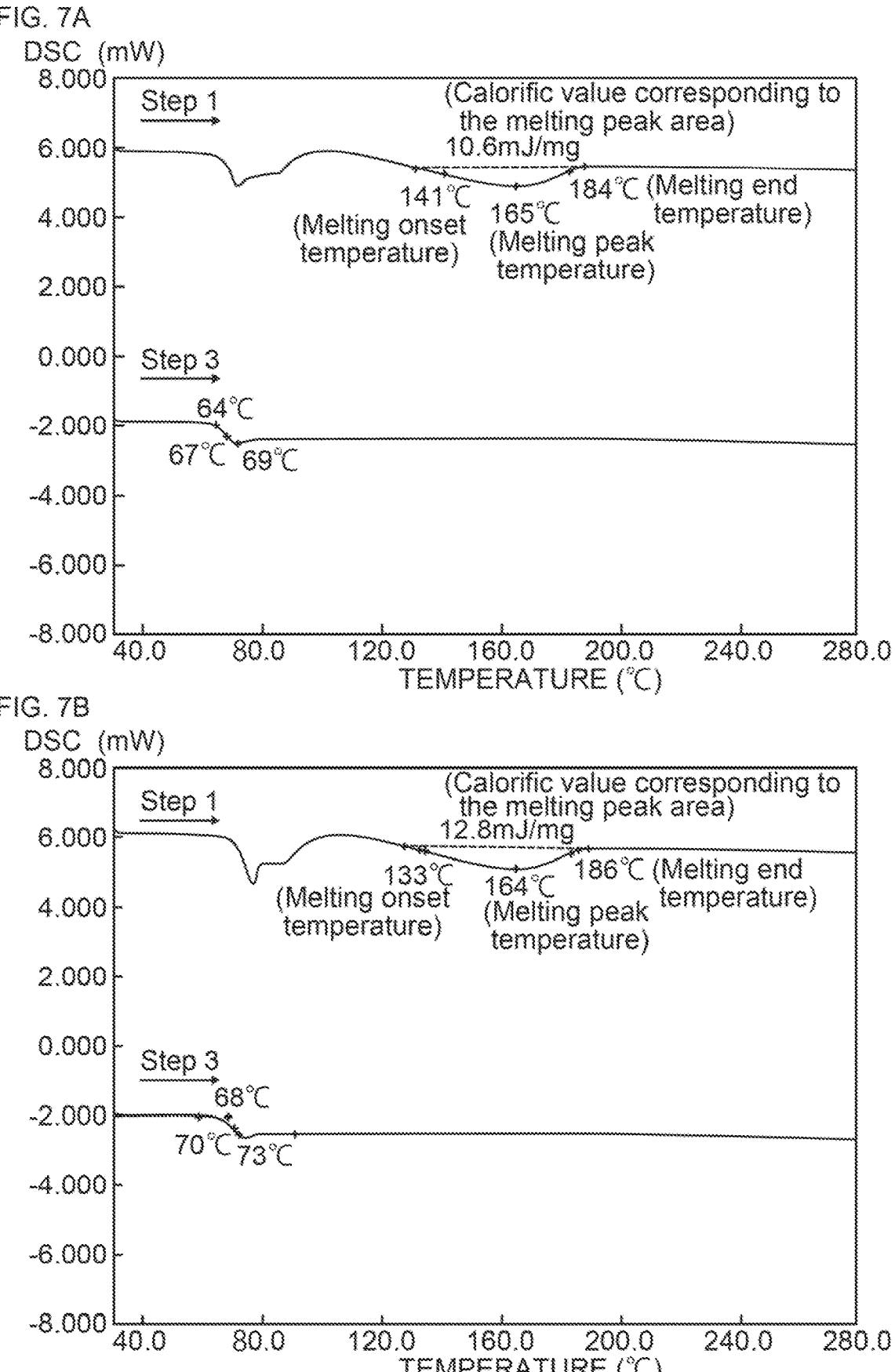
FIGS. 7A and 7B show the DSC charts for the polyester heat-shrinkable film of Example 1 and Comparative Example 1 of the present invention (the first invention), respectively.

In other words, FIGS. 7A and 7B show the DSC curves of the polyester heat-shrinkable films of Example 1 and Comparative Example 1 in the first invention, respectively, obtained by DSC measurement (only Step 1 and Step 3 are shown; the curve of Step 2 is omitted).

As described in the sections on the first polyester resin and the second polyester resin, such DSC curves can be obtained by DSC in accordance with JIS K7121:2012 (the same applies hereinafter).

Then, from the DSC curve of at least Step 1, the melting onset temperature (extrapolated melting onset temperature), melting peak temperature, melting end temperature (extrapolated melting end temperature), and calorific value corresponding to the melting peak area can be accurately measured.

In Step 1, a predetermined crystal melting peak is observed at 160-170° C. It is understood that the height of the melting peak and the calorific value corresponding to the peak area are considerably smaller than those of ordinary polyester resins.

More specifically, it is preferable that the temperature range of the calorific value corresponding to the melting peak area is within the range of about 140° C. to 185° C. and the calorific value the melting peak area is about 11 mJ/mg or less.

Next, referring to FIG. 8, the relationship between the melting point (° C.) and the thermal shrink stress (MPa) of the polyester heat-shrinkable film in the present invention (the first invention) will be explained.

Figure 8:
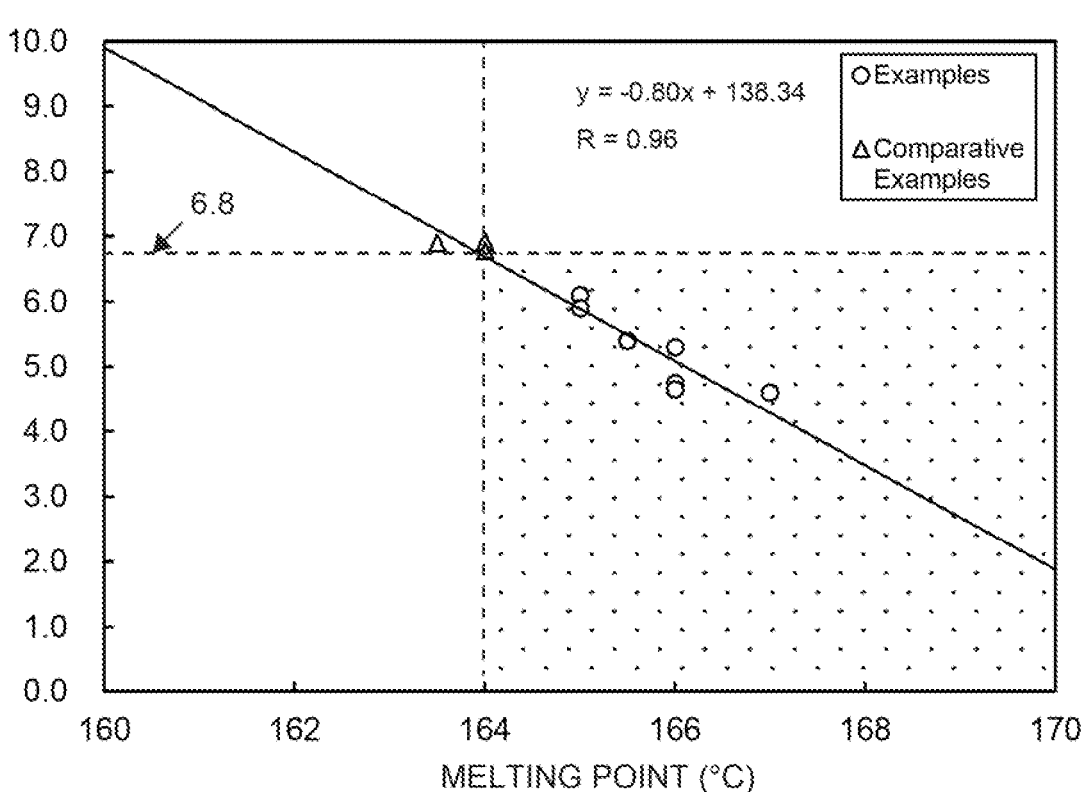
FIG. 8 shows the relationship between the melting point (° C.) and the thermal shrink stress (MPa) of the polyester heat-shrinkable film in the present invention (the first invention).

In other words, the horizontal axis of FIG. 8 shows the melting point (° C.) of the polyester heat-shrinkable film, and the vertical axis shows the thermal shrink stress (MPa) of the polyester heat-shrinkable film in the main shrinkage direction at 85° C.

From the characteristic curve shown in FIG. 8, it can be understood that there is a high correlation (linear approximation, with a correlation coefficient (R) of 0.96, for example) between the melting point of the polyester heat-shrinkable film and the thermal shrink stress (MPa) in the main shrinkage direction at 85° C.

Therefore, it is understood that by controlling the melting point of the polyester heat-shrinkable film, it is possible to control the thermal shrink stress (MPa) of the polyester heat-shrinkable film in the main shrinkage direction at 85° C.

(9) Difference Between Melting End Temperature and Melting Onset Temperature

When the melting onset temperature of the polyester heat-shrinkable film measured by DSC is Tm1 (° C.) and the melting end temperature is Tm2 (° C.), it is preferable that the value expressed by Tm2−Tm1 to be within the range of 35-55° C., although it is quite broad.

The reason for this is that in polyester heat-shrinkable films, if the numerical value represented by Tm2−Tm1 is outside the predetermined range described above, it may become difficult to control the calorific value corresponding to the peak area value described above within the predetermined range.

Therefore, it is more preferable that the numerical value expressed by Tm2−Tm1 of such polyester heat-shrinkable film is within the range of 38-53° C., and even more preferable that it is within the range of 41-51° C.

Since the Tm2−Tm1 of conventional polyester heat-shrinkable films is about 8-20° C., it is understood that the melting phenomenon occurs in a fairly broad temperature range in the present invention.

(10) Thickness

Furthermore, the thickness of the heat-shrinkable polyester film can be changed according to forms of various PET bottles, and generally, is preferably to be within the range of 20 to 70 μm.

The reason for this is that, when the thickness of the heat-shrinkable polyester film is below 20 μm, handleability becomes difficult, and thus a tensile force at break or the like is significantly degraded in some cases.

On the other hand, the reason for this is that, when the thickness of the heat-shrinkable polyester film is above 70 μm, in the case of heating the heat-shrinkable polyester film at a predetermined temperature, the heat-shrinkable polyester film is not uniformly thermally shrunk, or is difficult to produce with a uniform thickness in some cases.

Therefore, the thickness of the heat-shrinkable polyester film is more preferably to be within the range of 30 to 60 μm and further preferably to be within the range of 40 to 55 μm.

Incidentally, the thickness of the heat-shrinkable polyester film can be measured by using a micrometer (manufactured by Mitutoyo Corporation, product name "Thickness Gauge 547-401") according to ISO 4593.

(11) Functional Layer

A functional layer for imparting various functions may be provided, as necessary, in the heat-shrinkable polyester film in the range that does not impair the object and the like of the invention.

Examples of such a functional layer include a coating layer for imparting surface slipperiness, contamination resistance, weather resistance, or the like, a transfer layer, and a print layer for imparting designability.

And among these, a coating layer or a metal-evaporated layer using a surfactant or at least one of silica, titanium oxide, zinc oxide, zirconium oxide, alumina, metal salts, etc., is particularly desirable as a functional layer because it contributes greatly to improving antistatic performance and surface slipperiness.

In the case of the printing layer (primer coating), it is preferable to form letters, figures, symbols, etc. by gravure printing, assuming the shrinkage rate and shrinkage direction of the polyester heat-shrinkable film in advance.

Furthermore, the polyester heat-shrinkable film of the present invention has a relatively large surface energy, and when various inks are applied, the film has excellent coating properties and the formed printing layer has excellent adhesiveness to the polyester heat-shrinkable film as a substrate.

To be more specific, when a grid test in accordance with JIS K5400 is conducted on Example 1, etc., the number of residuals is usually found to be 90/100 grid or more, more preferably 95/100 grid or more, and even more preferably 99/100 grid or more.

Furthermore, as illustrated in FIG. 1B, it is also preferable to stack other resin layers 10a and 10b containing at least one of these various additives on one surface or both surfaces of the heat-shrinkable polyester film 10.

In this case, it is preferable that, when the thickness of the heat-shrinkable polyester film is regarded as 100%, the thickness of the single layer of the other resin layers to be additionally stacked or the total thickness thereof is usually to be within the range of 0.1 to 10%.

Further, a resin as a main component constituting the other resin layers may be the same polyester resin as that of the heat-shrinkable polyester film, or is preferably at least one of an acrylic resin, an olefin resin, a urethane resin, a rubber resin, and the like that are different from the polyester resin.

Further, it is also preferable to provide a shrinkage ratio adjustment layer 10c on the surface of the heat-shrinkable polyester film 10 so that the heat-shrinkable polyester film is formed to have a multi-layer structure so as to further achieve the hydrolysis prevention effect or mechanical protection, or the shrinkage ratio of the heat-shrinkable polyester film becomes uniform in the plane as illustrated in FIG. 1C.

Such a shrinkage ratio adjustment layer can be stacked as a predetermined layer composed of a polyester resin or the like by an adhesive, an application method, a heating treatment, or the like depending on shrinkage characteristics of the heat-shrinkable polyester film.

Second Embodiment

According to a second embodiment (sometimes called as the second invention), there is provided a heat-shrinkable polyester film derived from a polyester resin that is a reaction product of a polyvalent carboxylic acid and a polyalcohol, the heat-shrinkable polyester film containing at least 1,4-cyclohexanedimethanol and 2-methyl-1,3-propanediol as the polyalcohol, characterized in that a thermal shrink stress at 85° C. is below 6.8 MPa, the thermal characteristics equivalent to those of a heat-shrinkable film containing a polyvinyl chloride resin as a main component are exhibited, and the aforementioned problems can be solved.

That is, the second embodiment is basically a heat-shrinkable polyester film derived from a predetermined single polyester resin.

Hereinafter, the second embodiment (the second invention) will be described in detail by being divided into respective configurations while focusing on different matters from the first embodiment (the first invention) with reference to the drawings as appropriate.

1. Polyvalent Carboxylic Acid

The polyvalent carboxylic acid in the second invention can be equivalent to that described in the first invention, and thus the repetitive description will be omitted herein.

2. Polyalcohol (1) Type

In case of configuring the second invention, the polyalcohol is characterized by the use of a combination of a first polyalcohol having an alicyclic structure and a second polyalcohol having an alicyclic structure, i.e., a linear structure with branches or a linear structure without branches.

More specifically, as described in the first embodiment, it is preferable to use 1,4-cyclohexanedimethanol, etc. as the first polyalcohol and 2-methyl-1,3-propanediol, etc. as the second polyalcohol.

The reason for this is that, by blending these specific polyalcohols, the heat-shrinkable property, the glass transition temperature, and the like of the heat-shrinkable polyester film to be obtained can be accurately adjusted.

(2) Blending Amount

Furthermore, on the occasion of configuring the second invention, it is preferable that, in the case of containing the first polyalcohol such as 1,4-cyclohexanedimethanol and the second polyalcohol such as 2-methyl-1,3-propanediol, a total blending amount (mol %) thereof is within the range of 15 to 40 mol % when the polyalcohol is regarded as 100 mol %.

The reason for this is that, when the total blending amount is below 15 mol %, it is difficult to accurately adjust the heat-shrinkable property, the glass transition temperature, and the like of the heat-shrinkable polyester film to be obtained, and a value of the thermal shrinkage ratio at 85° C. is likely to be small in some cases.

On the other hand, the reason for this is that, when the total blending amount is above 40 mol %, conversely, it is difficult to accurately adjust the heat-shrinkable property, the glass transition temperature, and the like of the heat-shrinkable polyester film to be obtained, and the thermal shrinkage ratio at 60° C. and natural shrinkage are likely to be large in some cases.

Therefore, the total blending amount (mol %) of the first polyalcohol such as 1,4-cyclohexanedimethanol and the second polyalcohol such as 2-methyl-1,3-propanediol is more preferably to be within the range of 20 to 35 mol % and further preferably to be within the range of 25 to 33 mol % when the polyalcohol is regarded as 100 mol %.

(3) Blending Ratio

Furthermore, on the occasion of configuring the second invention, it is preferable that a blending ratio of the first polyalcohol such as 1,4-cyclohexanedimethanol/the second polyalcohol such as 2-methyl-1,3-propanediol is within the range of 10/90 to 90/10 by weight basis.

The reason for this is that, when the blending ratio of the first polyalcohol such as 1,4-cyclohexanedimethanol/the second polyalcohol such as 2-methyl-1,3-propanediol is below 10/90, it is difficult to accurately adjust the heat-shrinkable property, the glass transition temperature, and the like of the heat-shrinkable polyester film to be obtained, and a change in thermal shrinkage ratio before and after the aging treatment is increased in some cases.

On the other hand, the reason for this is that, when the blending ratio of the first polyalcohol such as 1,4-cyclo-hexanedimethanol/the second polyalcohol such as 2-methyl-1,3-propanediol is above 90/10, conversely, it is difficult to accurately adjust the heat-shrinkable property, the glass transition temperature, and the like of the heat-shrinkable polyester film to be obtained, and a value of the thermal shrink stress at 85° C. is likely to be large in some cases.

Therefore, the blending ratio of the first polyalcohol such as 1,4-cyclohexanedimethanol/the second polyalcohol such as 2-methyl-1,3-propanediol is more preferably within the range of 20/80 to 80/20 and further preferably within the range of 30/70 to 70/30.

3. Polyester Resin (1) Glass Transition Temperature

In case of configuring the second invention, it is preferable that a glass transition temperature (Tg) of the polyester resin is within the range of 50° C. to 90° C.

The reason for this is that, when Tg is below 50° C., heat resistance, durability, and the like of the polyester resin are significantly degraded, and natural shrinkage of the heat-shrinkable polyester film containing the polyester resin becomes large, so that storability is significantly degraded in some cases.

On the other hand, the reason for this is that, when Tg is above 90° C., it is difficult to accurately adjust the heat-shrinkable property and the like of the heat-shrinkable polyester film to be obtained, and particularly, the thermal shrinkage ratio as measured at 85° C. or lower is likely to be out of the predetermined range in some cases.

Therefore, Tg is more preferably within the range of 55° C. to 85° C. and further preferably within the range of 60° C. to 80° C.

(2) Thermal Shrink Stress

The thermal shrink stress in the second invention can be equivalent to that described in the first invention.

That is, it is characterized in that, in the heat-shrinkable polyester film, the thermal shrink stress in the main shrinkage direction as measured at 85° C. is below 6.8 MPa.

(3) Thermal Shrinkage Ratio

The thermal shrinkage ratio in the second invention can be equivalent to that described in the first invention.

That is, generally, a thermal shrinkage ratio in a main shrinkage direction (generally, a TD direction, the same applies hereinafter) as measured at 70° C. in hot water is within the range of 25 to 40%, and a thermal shrinkage ratio in the main shrinkage direction at 85° C. in hot water is within the range of 55 to 75%.

(4) Change in Thermal Shrinkage Ratio Before and After Aging Treatment

The thermal shrinkage ratio before and after the aging treatment in the second invention can be equivalent to those described in the first invention.

That is, it is preferable that, when thermal shrinkage ratio in the main shrinkage direction at the time of immersing the heat-shrinkable polyester film in hot water set at 65° C. before and after being left to stand for 60 days in an atmosphere of 23° C., 50% RH as the aging treatment are designated as A1(%) and A2(%), a numerical value expressed as A1-A2 is within the range of 13 to 25%.

Furthermore, it is further preferable that, when thermal shrinkage ratio in the main shrinkage direction at the time of immersing the heat-shrinkable polyester film in hot water set at 70° C. to 85° C., particularly set at 85° C., before and after being left to stand for 60 days in an atmosphere of 23° C., 50% RH are designated as B1(%) and B2(%), a numerical value expressed as B1-B2 is within the range of 0 to 5%.

(5) Melting Peak Temperature and Calorific Value Corresponding to the Melting Peak Area The melting peak temperature and the calorific value corresponding to the melting peak area in the second invention can be the same as those described in the first invention.

That is, when the polyester heat-shrinkable film has a melting peak in DSC (Step1), it is preferable that the melting peak temperature is usually within the range of above 164° C. to 170° C.

Also, the calorific value corresponding to the melting peak area in the second invention can be the same as that described in the first invention, i.e., it is preferable that the calorific value corresponding to the melting peak area of the polyester heat-shrinkable film measured by DSC is usually within the range of 6 to 18 mJ/mg.

(6) Difference Between Melting End Temperature and Melting Onset Temperature

As for Tm2−Tm1, which is the difference between the melting end temperature (Tm2) and the melting onset temperature (Tm 1) in the second invention, it is preferable to have a fairly broad temperature range, as described in the first invention.

In other words, it is preferable that the value represented by Tm2−Tm 1 is within the range of 35-55° C., more preferable within the range of 38-53° C., and even more preferable within the range of 41-51° C.

(7) Thickness

Regarding the thickness of the heat-shrinkable polyester film, also in the second invention, basically, the thickness is preferably the same numerical value range as that of the first invention.

Therefore, generally, such a thickness of the heat-shrinkable polyester film is preferably within the range of 20 to 70 μm, more preferably within the range of 25 to 65 μm, and further preferably within the range of 30 to 60 μm.

4. Additives

Also in the second invention, similarly to the first invention, a predetermined amount of additives such as an antioxidant, a weathering stabilizer, an antistatic agent, an antifog agent, a metal soap, a wax, an antifungal agent, an antibacterial agent, a nucleating agent, a flame retardant, or an inorganic slip agent may be blended, as necessary, in the heat-shrinkable polyester film within the scope of the object of the invention.

5. Heat-Shrinkable Polyester Film

It is preferable that functional layers for imparting various functions, for example, a coating layer for imparting surface slip property, contamination resistance, weather resistance, or the like, a transfer layer, a print layer for imparting designability, and the like are provided, as necessary, in the heat-shrinkable polyester film of the second invention, similarly to the first invention, in the range that does not impair the object and the like of the invention.

Third Embodiment

A third embodiment is a method for producing the heat-shrinkable polyester films of the first embodiment and the second embodiment.

1. Preparation and Mixing Step of Raw Materials

As raw materials, main ingredients and additives such as amorphous polyester resins, crystalline polyester resins, rubber resins, antistatic agents, and hydrolysis inhibitors are prepared.

In this case, it is preferable to dry the amorphous polyester resins, which are the main component, to an absolute dry state by heating at the predetermined temperature which is generally Tg−10° C. for a predetermined time which is generally 3-10 hours.

Next, it is preferable that the prepared amorphous polyester resins, crystalline polyester resin, and the like are charged into a stirring container while being weighed and are stirred and mixed by using a stirring apparatus until the mixture becomes homogeneous.

2. Sheet Production Step

Next, typically, it is preferable to produce a sheet having a predetermined thickness by extrusion molding (a T-die method), an inflation method, or a cast molding method.

More specifically, for example, extrusion molding is performed by an extruder under a condition of an extrusion temperature of 245° C., and thereby a sheet having a predetermined thickness (generally, 200 to 300 μm) can be obtained.

3. Production of Heat-Shrinkable Polyester Film

Next, the sheet thus obtained is heated and pressed by using a heat-shrinkable film production apparatus (tenter) while being moved on rolls or between rolls, and thereby a heat-shrinkable polyester film is produced.

However, as a stretching treatment method for exhibiting such shrinkable property, an inflation method, a roll stretching method, a tenter stretching method, and a combination thereof are known.

Further, from the viewpoint of obtaining more satisfactory productivity, sheet molding by a cast molding method and a combination of roll stretching and tenter stretching is further suitable.

That is, the polyester molecule constituting the heat-shrinkable polyester film is preferably crystallized into a predetermined shape by stretching in a predetermined direction while the film is heated and pressed, while the film width is basically increased at a predetermined stretching temperature and at a predetermined stretching ratio.

Further, by solidification in this state, a heat-shrinkable polyester film having heat-shrinkable property that is used as decoration, a label, and the like can be produced.

Incidentally, usually, it is preferable that, after the sheet is produced by a T-die method, an inflation method, or the like, the sheet is heated to a temperature equal to or higher than the glass transition temperature of the resin to be stretched at 3 to 8 times, preferably about 4 to 6 times, in the main stretching direction (the width direction of the film original sheet, that is, the TD direction).

4. Inspection Step for Heat-Shrinkable Polyester Film

It is preferable that the following characteristics and the like of the heat-shrinkable polyester film thus produced are continuously or intermittently measured and predetermined inspection steps are provided.

That is, the following characteristics and the like are measured by the predetermined inspection steps and are checked to fall into a value within the predetermined range, and thereby a heat-shrinkable polyester film having more uniform shrinkage characteristics and the like can be obtained.

1) Visual inspection of the appearance of the heat-shrinkable polyester film
2) Thickness variation
3) Tensile strength (ASTM D882)
4) Tensile elongation (ASTM D882)
5) Coefficient of friction (ASTM D1894)
6) Specific gravity (ASTM D792)
7) Ring crush test (TAPPI T882)
8) Tear strength (ASTM D1922)
9) DSC measurement for thermal characteristics (Tg, melting point, the calorific value corresponding to the peak area, and the like)

Fourth Embodiment

A fourth embodiment is an embodiment relating to a method for using the heat-shrinkable polyester films of the first embodiment and the second embodiment.

Therefore, any methods can be suitably applied as long as they are at least known methods for using a heat-shrinkable polyester film.

For example, when the method for using the heat-shrinkable polyester film is performed, first, the heat-shrinkable polyester film is cut into an appropriate length or width, and a continuous cylindrical object (hereinafter, sleeved label) is formed.

In the formation of long cylindrical objects, solvents such as tetrahydrofuran, 1,3-dioxolane, xylene, and mixtures thereof are used to melt/adhere the film.

Next, the sleeved label is supplied to an automatic label applicator (shrink labeler) and is further cut into a necessary length.

Next, the sleeved label is applied to PET bottles and the like.

Next, as for the heating treatment for the sleeved label which is applied to PET bottles and the like (hereinafter, sleeved bottle), sleeved bottles pass through the shrink tunnel, such as a hot air tunnel or a steam tunnel.

The shrink tunnel has heat sources, such as a hot air, infrared radiation, and hot steam, and has a capability to apply these heat sources to the sleeved bottles to shrink uniformly.

Thus, the film adheres to the outer surface of the PET bottles and the like so that label-attached containers can be obtained rapidly.

EXAMPLES

Hereinafter, the invention will be described in detail based on Examples. However, the scope of rights of the invention is not limited by the description of Examples without particular reasons.

Furthermore, the amorphous polyester resin, the crystalline polyester resin, and the additive used in Examples are as follows.

Incidentally, the inherent viscosity (IV value) described in the section of the amorphous polyester resin was measured by using an Ubbelohde viscometer at a temperature of 30° C. in a mixed solvent of phenol/1,1,2,2-tetrachloroethane (weight ratio=1/1).

(PETG 1)

PETG 1 is a first polyester resin (manufactured by Eastman Chemical Company, trade name "Embrace LV", glass transition temperature (Tg): 68.2° C., inherent viscosity (IV value): 0.7, density: 1.30 g/cm$^3$) composed of dicarboxylic acid: terephthalic acid 100 mol % and 1,4-cyclohexanedimethanol, ethylene glycol, diethylene glycol.

More concretely, PETG 1 or "Embrace LV" is composed of 100 mol % of terephthalic acid, 63 mol % of ethylene glycol, 13 mol % of diethylene glycol and 24 mol % of 1,4-cydohexanedimethanol.

It has been found that when the overall amount of the first polyalcohol used in producing PETG1 is 100 mol %, the content of 1,4-cyclohexanedimethanol can be changed to 20-35 mol %, ethylene glycol to 50-65 mol %, and diethylene glycol to 5-20 mol %, as long as it is within the specified range.

(PETG 2)

PETG 2 is a second polyester resin (manufactured by Tainan Spinning Co., LTD., trade name "MKD3", glass transition temperature (Tg): 61.6° C., inherent viscosity (IV value): 0.7 composed of dicarboxylic acid: terephthalic acid 100 mol %, and the diol components (ethylene glycol 64.4 mol %, 2-methyl-1,3-propanediol 25.6 mol %, and diethylene glycol 10 mol %).

It has been found that when the overall amount of the second polyalcohol used in making PETG2 is 100 mol %, the content of 2-methyl-1,3-propanediol can be changed to 20-35 mol %, ethylene glycol to 50-65 mol %, and diethylene glycol to 5-20 mol %.

(PETG 3)

PETG 3 is a second polyester resin of the amorphous polyester resin consisting of 1,4-cyclohexanedimethanol-modified polyethylene terephthalate (Eastman, product name: EASTAR PETG6763, dicarboxylic acid: 100 mol % of dicarboxylic acid, 1,4-cyclohexanedimethanol: 20 to 50 mol % of the total amount of polyalcohol components (100 mol %), total amount of ethylene glycol and diethylene glycol: 50 to 80 mol %, glass transition temperature (Tg): 83° C., inherent viscosity (IV value): 0.75)

It has been found that 1,4-cyclohexanedimethanol, ethylene glycol, and diethylene glycol can be changed within the predetermined range described above when the total amount of the second polyalcohol used in making PETG3 is 100 mol %.

(PVC Film)

Polyvinyl chloride resin (manufactured by Shintech Inc., trade name "SE800", K value: 60.6 to 62.0)

(Additive (Anti-Blocking Agent))

Silica masterbatch (manufactured by Sukano AG, trade name "G dc 5559-E", product containing 20% by weight of silica) obtained by blending 20 parts by mass of silica with respect to 80 parts by mass of polyethylene terephthalate

Example 1

1. Production of Heat-Shrinkable Polyester Film

PETG 1 dried for 6 hours at 60° C. (that is, the range of Tg-10° C.) and PETG 2 dried for 6 hours at 50° C. (that is, the range of Tg−10° C.) were prepared as the amorphous polyester resins.

Next, PETG 1 and PETG 2 thus prepared were charged in a total amount of 1000 g into a stirring container so that the blending ratio of PETG 1 and PETG 2 became 60/40 by weight basis.

Furthermore, the aforementioned anti-blocking agent dried under a predetermined condition was blended as an anti-blocking agent of the heat-shrinkable film in a ratio of 1 part by weight when the total amount of PETG 1 and PETG 2 that are amorphous polyester resins was regarded as 100 parts by weight, thereby obtaining a raw material for the heat-shrinkable film.

Next, this raw material for the heat-shrinkable film was extruded under 245° C., and thereby created a sheet whose thickness is 250 μm.

Finally, a heat-shrinkable polyester film having a thickness of 50 μm and a variation in thickness of below 5% was produced by using a heat-shrinkable film production apparatus from the sheet at a preheating temperature of 110° C., a stretching temperature of 77° C., and an annealing temperature of 83.5° C. and at a stretching ratio (MD direction: 1.08 times, TD direction: 5 times).

2. Evaluation of Heat-Shrinkable Polyester Film
(1) Thermal Shrinkage Ratio

The thermal shrinkage ratio of the heat-shrinkable polyester film thus obtained was measured according to ASTM D2732-08.

That is, the heat-shrinkable polyester film thus obtained was cut into a square shape having a length of 100 mm along the main shrinkage direction (TD direction) and a length of 100 mm along a non-main shrinkage direction (MD direction), and this was used as measurement samples.

Next, each sample was immersed in each thermostat bath inside which hot water temperature-controlled to 60° C. to 100° C. in increments of 5° C. is accommodated, for 10 seconds, and was thermally shrunk.

Next, the thermal shrinkage ratio (%) in the main shrinkage direction (TD direction) and the non-main shrinkage direction (MD direction) were calculated from a change in dimension before and after the heating treatment at each temperature according to the following Equation (1), respectively.

$$\text{Shrinkage ratio} = (100 \text{ mm} - \text{Length of the film after thermal shrinkage})/100 \text{ mm} \times 100 \qquad (1)$$

(2) Thermal Shrink Stress

The thermal shrink stress of the heat-shrinkable polyester film thus obtained was measured according to ISO 14616-1997.

That is, the heat-shrinkable polyester film thus obtained was cut into a strip shape having a length of 90 mm along the main shrinkage direction (TD direction) and a length of 15 mm along the non-main shrinkage direction (MD direction), and this was used as a test piece.

Next, the shrink force (N/15 mm) of the test piece at 85° C. was measured by using a film thermal shrink stress tester (product name "FST-02" manufactured by Labthink Corporation).

Next, the obtained shrink force was divided by the thickness (50 μm) and the obtained value was regarded as the thermal shrink stress (MPa) at 85° C.

(3) DSC Measurement

For the obtained polyester heat-shrinkable film, glass transition temperature, extrapolated melting onset temperature, melting point (melting peak temperature), extrapolated melting end temperature, and the calorific value corresponding to the melting peak area were measured by a DSC (product name "DSC7000X" manufactured by Hitachi High-Tech Science Corporation) under the predetermined conditions, respectively.

More specifically, a sample of polyester heat-shrinkable film was dried in a dry oven at 60° C. for at least 6 hours.

Then, the sample was set in the DSC and the temperature was once raised to a high temperature range in Step 1 (temperature increase from 25° C. to 280° C. at a rise rate of 10° C./min).

Next, the temperature was lowered to a lower temperature range in Step 2 (temperature decrease from 280° C. to 25° C. at a rate of 30° C./min).

Finally, the temperature was raised to the high temperature range again in Step 3 (temperature increase from 25° C. to 280° C. at a rate of 10° C./min).

Then, from the DSC curve obtained in Step 1, extrapolated melting onset temperature, melting point (melting peak temperature), extrapolated melting end temperature, and the transition enthalpy were measured respectively. Moreover, from the DSC curve obtained in Step 3, glass transition temperature was measured.

Examples 2 and 3

In Examples 2 and 3, as shown in Table 1, the influence of the blending ratio by weight basis of each of PETG 1 and PETG 2 was studied.

That is, in Example 2, the blending ratio of PETG1/PETG2 was changed to 40/60, and in Example 3, the blending ratio of PETG1/PETG2 was changed to 50/50, and polyester heat-shrinkable films were made, respectively. In the same way as in Example 1, the thermal shrinkage ratio at each temperature, the thermal shrink stress at 85° C., the melting point, the calorific value corresponding to the melting peak area, and the like were evaluated. The obtained results are shown in Table 2.

Examples 4 and 5

In Examples 4 and 5, polyester heat-shrinkable films were prepared in the same manner as in Example 1, except that a mixture of PETG1 and PETG3 (weight mixture ratio: 80/20) was used instead of PETG1 in Examples 2-3 as shown in Table 1, and the thermal shrinkage ratio at each temperature, the thermal shrink stress at 85° C., the melting point, the calorific value corresponding to the melting peak area, and the like are evaluated. The obtained results are shown in Table 2.

Examples 6 and 7

In Examples 6 and 7, the effect of a predetermined aging process after making polyester heat-shrinkable films was studied as shown in Table 1.

Namely, in Example 6, a polyester heat-shrinkable film with the same formulation as in Example 1 was made, and in Example 7, a polyester heat-shrinkable film with the same formulation as in Example 2 was made.

These heat-shrinkable films were then cut into 800 mm×800 mm pieces and further aged under the environmental conditions of 23° C., 50% RH, for 60 days, and evaluated for the thermal shrinkage ratio at each temperature, the thermal shrink stress at 85° C., and the like in the same manner as in Examples 1 and 2. The obtained results are shown in Table 2.

Comparative Examples 1 and 2

In Comparative Examples 1 and 2, various heat-shrinkable polyester films were produced similarly to Example 1, except that the blending ratio (weight basis) of PETG 1 and PETG 2 were changed to 100/0 (Comparative Example 1) and 81/19 (Comparative Example 2), respectively, as shown in Table 1, and the thermal shrinkage ratio at each temperature, the thermal shrink stress at 85° C., the melting point, the calorific value corresponding to the melting peak area, and the like. are evaluated. The obtained results are shown in Table 2.

Comparative Example 3

In Comparative Example 3, the thermal shrinkage ratio at each temperature, the thermal shrink stress at 85° C., and the like were evaluated similarly to Example 1, except that a heat-shrinkable polyvinyl chloride film was produced by using a polyvinyl chloride resin as shown in Table 1. The obtained results are shown in Table 2.

Comparative Example 4

In Comparative Example 4, as shown in Table 1, the influence of the predetermined aging treatment after the heat-shrinkable polyester film was produced was studied.

That is, in Comparative Example 4, the thermal shrinkage ratio at each temperature, the thermal shrink stress at 85° C., and the like were evaluated similarly to Comparative Example 2, except that, after a heat-shrinkable polyester film of Comparative Example 2 was produced, the film was cut into a size of 800 mm×800 mm once and then further subjected to the aging treatment under environmental condition for 60 days in an atmosphere of 23° C., 50% RH. The obtained results are shown in Table 2.

TABLE 1

| | Blending amount | | | | | |
| | PETG 1 (pbw) | PETG 2 (pbw) | PETG 3 (pbw) | PVC (pbw) | Additive (pbw) | Aging treatment |
|---|---|---|---|---|---|---|
| Example 1 | 60 | 40 | | | 1 | No |
| Example 2 | 40 | 60 | | | 1 | No |
| Example 3 | 50 | 50 | | | 1 | No |
| Example 4 | 32 | 60 | 8 | | 1 | No |
| Example 5 | 40 | 50 | 10 | | 1 | No |
| Example 6 | 60 | 40 | | | 1 | Yes |
| Example 7 | 40 | 60 | | | 1 | Yes |
| Comparative Example 1 | 100 | | | | 1 | No |
| Comparative Example 2 | 81 | 19 | | | 1 | No |
| Comparative Example 3 | | | | 100 | | No |
| Comparative Example 4 | 81 | 19 | | | 1 | Yes |

TABLE 2

| | | Ex. 1 | Ex. 2 | Ex. 3 | Ex. 4 | Ex. 5 | Ex. 6 | Ex. 7 | CE. 1 | CE. 2 | CE. 3 | CE. 4 |
|---|---|---|---|---|---|---|---|---|---|---|---|---|
| Thermal | 60° C. | 0 | −1 | 0 | −1 | 0 | 0 | 0 | 0 | 0 | 0 | 0 |
| shrinkage | 65° C. | 0 | −2 | −1 | −1 | 0 | 0 | 0 | 3 | 1 | 1 | 0 |
| ratio (%) | 70° C. | −2 | −5 | −3 | −4 | −2 | −3 | −6 | 0 | −1 | 3 | −1 |
| in MD | 75° C. | −4 | −7 | −6 | −6 | −5 | −4 | −6 | −4 | −3 | 3 | −3 |
| direction | 80° C. | −4 | −5 | −5 | −6 | −6 | −3 | −3 | −4 | −3 | 4 | −3 |
| | 85° C. | −1 | −3 | −2 | −4 | −3 | −1 | −4 | −1 | 0 | 4 | −2 |
| | 90° C. | 2 | 1 | 1 | −1 | 0 | 2 | −2 | 1 | 2 | 5 | 3 |
| | 95° C. | 4 | 4 | 4 | 2 | 3 | 4 | 0 | 4 | 6 | 5 | 4 |
| | 100° C. | 4 | 2 | 3 | 1 | 3 | 4 | 1 | 4 | 5 | 5 | 5 |
| Thermal | 60° C. | 2 | 6 | 4 | 7 | 3 | 0 | 0 | 1 | 2 | 3 | 0 |
| shrinkage | 65° C. | 15 | 23 | 19 | 23 | 19 | 0 | 0 | 11 | 12 | 9 | 0 |
| ratio (%) | 70° C. | 32 | 37 | 34 | 36 | 35 | 31 | 33 | 27 | 3 | 26 | 25 |
| in TD | 75° C. | 46 | 49 | 48 | 50 | 48 | 46 | 46 | 46 | 46 | 42 | 42 |
| direction | 80° C. | 54 | 57 | 56 | 56 | 57 | 54 | 55 | 58 | 56 | 50 | 55 |
| | 85° C. | 65 | 64 | 65 | 63 | 64 | 64 | 61 | 69 | 67 | 56 | 65 |
| | 90° C. | 72 | 70 | 71 | 68 | 69 | 71 | 68 | 75 | 73 | 58 | 72 |
| | 95° C. | 76 | 74 | 75 | 72 | 72 | 75 | 72 | 78 | 77 | 59 | 76 |
| | 100° C. | 76 | 74 | 75 | 72 | 72 | 76 | 72 | 78 | 76 | 61 | 76 |
| Thermal shrink force(N/ 15 mm) | | 4.6 | 3.5 | 4.1 | 3.5 | 4 | 4.5 | 3.5 | 5.2 | 5.1 | 1.3 | 5.2 |
| Thermal shrink stress(MPa) | | 6.1 | 4.7 | 5.4 | 4.6 | 5.3 | 5.9 | 4.7 | 6.9 | 6.8 | 5.7 | 6.9 |
| Melting peak temperature(° C.) | | 165 | 166 | 165.5 | 167 | 166 | 165 | 166 | 164 | 164 | — | 163.5 |
| Calorific value corresponding to the melting peak area(mJ/mg) | | 10.6 | 12.9 | 11.7 | 13.5 | 12.5 | 10.5 | 13 | 12.8 | 10.6 | — | 10.5 |
| Glass transition temperature(° C.) | | 66.5 | 65.3 | 65.7 | 66 | 66.8 | 66.6 | 65.2 | 69.6 | 67.4 | 87 | 67.4 |

INDUSTRIAL APPLICABILITY

According to the first invention of the present invention, a polyester heat-shrinkable film derived from a mixture of multiple amorphous polyester resins that are reaction products of a polyvalent carboxylic acid and a polyalcohol as a mixed resin and in which the thermal shrink stress is below a predetermined value, can be provided.

More specifically, the mixed resin includes a first polyester resin comprising a predetermined first polyalcohol having an alicyclic structure and a second polyester resin comprising a predetermined second polyalcohol not having an alicyclic structure.

This configuration enables the film to exhibit low shrink stress equivalent to that of Polyvinyl chloride resin film, even though the polyester resin is the main component.

Furthermore, according to the second invention of the invention, a polyester heat-shrinkable film derived from a single amorphous polyester resin that is a reaction product of a polyvalent carboxylic acid and specific polyalcohols, can be provided.

More specifically, the polyalcohol is a mixture of a first polyalcohol having an alicyclic structure and a second polyalcohol not having an alicyclic structure, and the thermal shrink stress is below-mentioned predetermined value.

This configuration enables the film to exhibit low shrink stress equivalent to that of Polyvinyl chloride resin film, even though the polyester resin is the main component.

Thus, the heat-shrinkable polyester film of the present invention meets a thickness reduction or the like for PET beverage bottles.

Namely, in a case where the stiffness of the entire bottle is lowed accordance with the thickness reduction, the deformation or the like of the PET bottle due to both the low stiffness and the shrinkage of the film can be effectively prevented.

Moreover, the polyester heat-shrinkable film of the present invention has excellent aging resistance, and changes in physical properties such as the thermal shrinkage ratio and the thermal shrink stress can now be kept as small as possible even after long-term storage.

Furthermore, as compared to a heat-shrinkable polyvinyl chloride film, the heat-shrinkable polyester film of the invention has the advantage for non-dioxin emission during incineration and virtually eliminating the addition of plasticizers, thus reducing the risk of environmental problems, and is also easy to recycle.

Therefore, the heat-shrinkable polyester film of the invention is easy to use, and can be applied to various PET bottles and the like even having a thin or thick thickness and having complicated shapes, and as a result, general-purpose versatility can be significantly widened, and the industrial applicability thereof can be said to be extremely high.

EXPLANATIONS OF LETTERS OR NUMERAL

10 HEAT-SHRINKABLE POLYESTER FILM
10*a* OTHER RESIN LAYER 1
10*b* OTHER RESIN LAYER 2
10*c* SHRINKAGE RATIO ADJUSTMENT LAYER
What is claimed is:

1. A heat-shrinkable polyester film derived from a mixture of multiple amorphous polyester resins that are reaction products of a polyvalent carboxylic acid and polyalcohols as a mixed resin, wherein the mixed resin includes a first polyester resin made of a first polyalcohol having an alicyclic structure and a second polyester resin made of a second polyalcohol not having an alicyclic structure, the first polyalcohol contains 1,4-cyclohexanedimethanol, ethylene glycol and diethylene glycol, and when the total amount of the first polyalcohol is 100 mol %, the amount of 1,4-cyclohexanedimethanol is 20 to 35 mol %, the amount of ethylene glycol is 50 to 65 mol %, and the amount of diethylene glycol is 5 to 20 mol %, the second polyalcohol contains 2-methyl-1,3-propanediol, ethylene glycol and diethylene glycol, and when the total amount of the second polyalcohol is 100 mol %, the amount of 2-methyl-1,3-propanediol is 20 to 30 mol %, the amount of ethylene glycol is 50 to 65 mol %, and the amount of diethylene glycol is 5 to 20 mol %, the blending ratio of the first polyester resin and the second polyester resin is within the range of 20/80 to 80/20 by weight basis, the thermal shrink stress at 85° C. is below 6.8 MPa, and the thermal shrinkage ratio in the main shrinkage direction at 70° C. is within the range of 25-40%, and the thermal shrinkage ratio in the main shrinkage direction at 85° C. is within the range of 55-75%.

2. The heat-shrinkable polyester film according to claim 1, wherein the numerical value expressed by A1-A2 is within the range of 13-25% when A1 (%) and A2 (%) are the thermal shrinkage ratio in the main shrinkage direction on the condition that the said film is immersed in hot water at 65° C. before and after being left in an atmosphere of 23° C. and 50% RH for 60 days.

3. The heat-shrinkable polyester film according to claim 1, wherein the numerical value expressed by B1-B2 is within the range of 0-5% when B1 (%) and B2 (%) are the thermal shrinkage ratio in the main shrinkage direction on the condition that the said film is immersed in hot water at 85° C. before and after being left in an atmosphere of 23° C. and 50% RH for 60 days.

4. The heat-shrinkable polyester film according to claim 1, wherein the said film exhibits a melting peak when measured by DSC, the melting peak temperature is within the range of above 164° C. and 170° C. or less, and the calorific value corresponding to the melting peak area is within the range of 6 to 18 mJ/mg.

5. The heat-shrinkable polyester film according to claim 1, wherein the glass transition temperature of the first polyester resin is higher than that of the second polyester resin, the glass transition temperature of the first polyester resin is within the range of 60 to 90° C., the glass transition temperature of the second polyester resin is within the range of 50 to 80° C., and the said film indicates one baseline shifting in the DSC measurement that corresponds to one glass transition temperature in the range of 63-70° C.

6. The heat-shrinkable polyester film according to claim 1, wherein the inherent viscosity of the first polyester resin is within the range of 0.65 to 0.85 dL/g, the inherent viscosity of the second polyester resin is within the range of 0.65 to 0.85 dL/g, and the difference between them is ±0.2 dL/g or less.

* * * * *